(12) United States Patent
Ohmiya et al.

(10) Patent No.: US 8,681,230 B2
(45) Date of Patent: Mar. 25, 2014

(54) PICTURE PROCESSING DEVICE, PICTURE PROCESSING METHOD, PROGRAM FOR PICTURE PROCESSING, AND IMAGING DEVICE

(75) Inventors: Jun Ohmiya, Kyoto (JP); Hitoshi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 13/521,083

(22) PCT Filed: Nov. 8, 2011

(86) PCT No.: PCT/JP2011/006228
§ 371 (c)(1),
(2), (4) Date: Jul. 9, 2012

(87) PCT Pub. No.: WO2012/063467
PCT Pub. Date: May 18, 2012

(65) Prior Publication Data
US 2012/0281104 A1    Nov. 8, 2012

(30) Foreign Application Priority Data
Nov. 11, 2010  (JP) ................................ 2010-253260

(51) Int. Cl.
*H04N 5/228* (2006.01)

(52) U.S. Cl.
USPC ...................................................... 348/208.6

(58) Field of Classification Search
USPC ......... 348/208.6, 208.5, 208.1, 208.2, 208.14
See application file for complete search history.

(56) References Cited

U.S. PATENT DOCUMENTS 7,092,019 B1    8/2006  Ogata et al.

2007/0140591 A1 *  6/2007  Kurata ......................... 382/278
2008/0100709 A1    5/2008  Furukawa
2010/0080419 A1    4/2010  Okugi et al.

FOREIGN PATENT DOCUMENTS

| JP | 2000-339473 | 12/2000 |
|---|---|---|
| JP | 2000-341582 | 12/2000 |
| JP | 2003-018561 | 1/2003 |
| JP | 2004-198159 | 7/2004 |
| JP | 2005-295495 | 10/2005 |
| JP | 2006-295626 | 10/2006 |
| JP | 2007-129587 | 5/2007 |
| JP | 2008/112210 | 5/2008 |
| JP | 2010-086267 | 4/2010 |
| JP | 4446041 | 4/2010 |

OTHER PUBLICATIONS

International Search Report issued Dec. 13, 2011 in International (PCT) Application No. PCT/JP2011/006228.

* cited by examiner

*Primary Examiner* — Aung S Moe
*Assistant Examiner* — Stephen Coleman
(74) *Attorney, Agent, or Firm* — Wenderoth, Lind & Ponack, LLP.

(57) ABSTRACT

The picture processing device of the present invention includes: a rotational motion distance calculating unit which calculates a rotational motion distance of a second picture with respect to a first picture; a cutout picture generating unit which (i) generates a first cutout picture from the first picture, and (ii) and generates a second cutout picture from a first corrected picture, the first corrected picture being generated from the second picture whose rotational displacement amount, in a combination of directions in three axes, is corrected; a parallel motion amount calculating unit which calculates a parallel motion amount of a second cutout picture with respect to the first cutout picture; and a motion amount determining unit which determines a motion amount of the second picture with respect to the first picture.

20 Claims, 20 Drawing Sheets

FIG. 3A
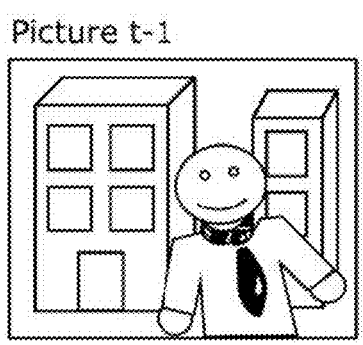
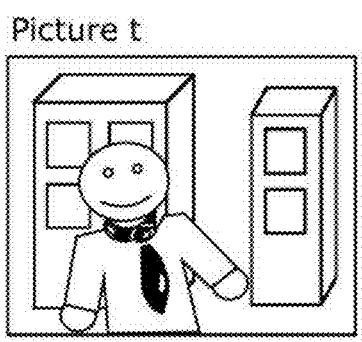

FIG. 3B
Picture t-1
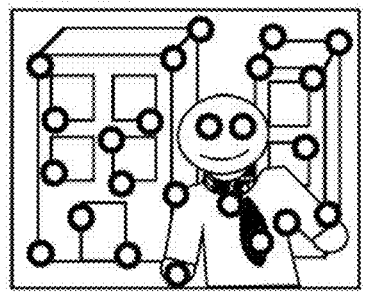
Picture t
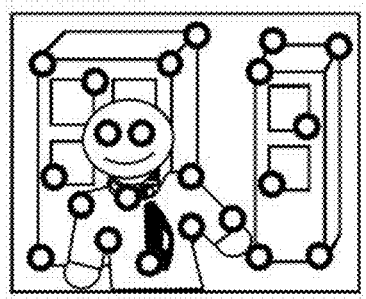
○ Feature point

FIG. 6

| Coordinate | Feature amount | Spherical coordinate | Neighboring feature 1 | Neighboring feature 2 | Neighboring feature 3 | Neighboring feature 4 |
|---|---|---|---|---|---|---|
| (0, 0) | 0 | (0, 0, 1) | 7.1 | 45 | 10 | ... |
| (3, 105) | 45.4 | ... | 10.0 | 30 | 20 | ... |
| (48, 29) | 102.1 | ... | 3.5 | 45 | 5 | ... |
| (256, 1) | 4.8 | ... | ... | ... | ... | ... |

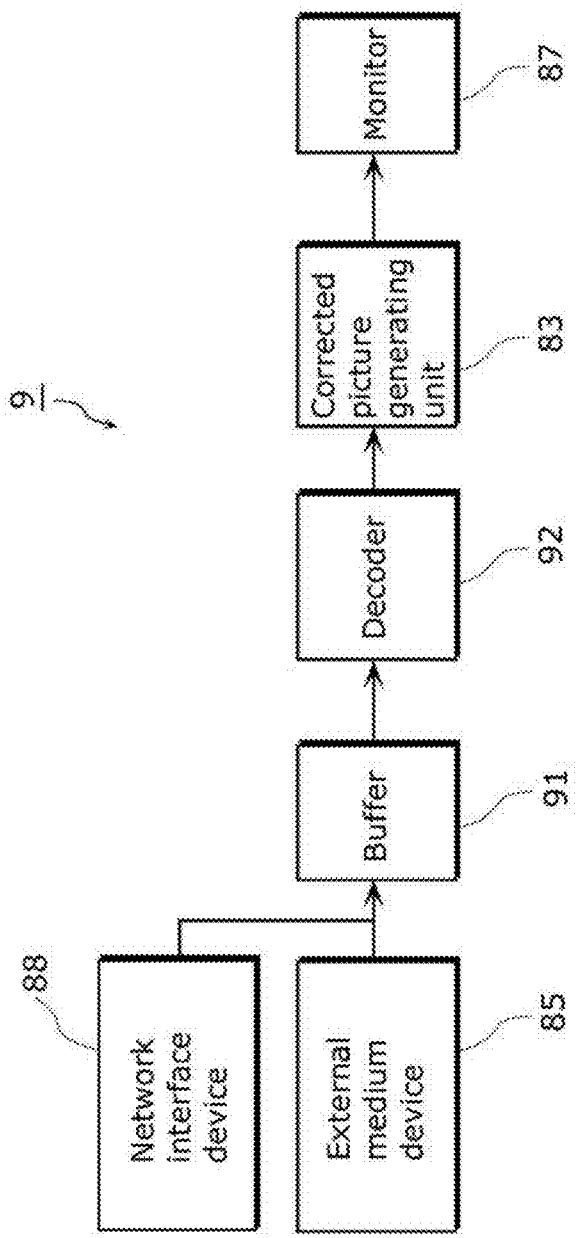

PICTURE PROCESSING DEVICE, PICTURE PROCESSING METHOD, PROGRAM FOR PICTURE PROCESSING, AND IMAGING DEVICE

TECHNICAL FIELD

The present invention relates to a picture processing device, a picture processing method, a program for picture processing, and an imaging device. More particularly, the present invention relates to a technique to correct pictures.

BACKGROUND ART

Recently, camera shake correction techniques have been proposed to correct motion blur on pictures for the use of imaging devices such as a camera and a camcorder.

For example, Patent Literature 1 discloses the following motion blur correction technique based on picture processing: first, automatically extracting, from picture data of moving pictures captured by a camera, a predetermined number of feature points for each frame picture; then automatically tracking the feature points in each frame picture of the moving pictures, and calculating the corresponding relationship of the feature points between the frame pictures; and finally calculating a camera vector from the three-dimensional position coordinates of the feature points whose corresponding relationship is calculated. Here, the camera vector includes three-dimensional position coordinates and three-dimensional rotating coordinates of the camera. Moreover, for example, Patent Literature 2 proposes a technique to correct motion blur developed on fisheye images: cutting out part of a perspective projection image and processing the part, according to the distortion characteristics observed in the center part and peripheral part of the lens.

CITATION LIST

Patent Literature

[PTL 1]
Japanese Unexamined Patent Application Publication No. 2005-295495
[PTL 2]
Japanese Unexamined Patent Application Publication No. 2006-295626

SUMMARY OF INVENTION

Technical Problem

The techniques disclosed in Patent Literatures 1 and 2, however, face the following difficulties in high-accuracy camera-shake correction.

Specifically, the technique disclosed in Patent Literature 1 fails to consider a problem that an object included in a moving picture is distorted, depending on its position in the moving picture. Thus, depending on the direction at which the camera moves and on the degree of the motion of the camera, the camera vector (motion amount indicating displacement amount between frame pictures) cannot be calculated accurately. This could result in the failure of the motion blur correction itself. This problem is particularly apparent in ultrawide-angle capturing, such as capturing fisheye images.

The technique in Patent Literature 2 involves in, first, converting fisheye images into perspective projection images when obtaining a motion blur amount (degree of displacement) found on the fisheye image, and calculating, as a motion amount between the fisheye images, the motion amount indicating the displacement amount between the perspective projection images. Similar to Patent Literature 1, however, Patent Literature 2 fails to consider a problem that the object distorts when the position of the object shifts in the fisheye image. In other words, Patent Literature 2 misses the two points: The shape of object alters (distorts) significantly in the created perspective projection image, depending on a position of the object in the fisheye image; and the scale of the motion amount varies between the center part and the peripheral part in the perspective projection image, depending on the alteration of the object's shape (distortion). Thus, the position of the object in a fisheye image could badly affect the accuracy of the motion amount to be calculated.

Described below with reference to the drawings is how distortion develops in a cutout picture of a fisheye image due to a position of the object. FIGS. 1A to 2B show how an object in a cutout picture distorts due to a position of an object in a fisheye image. FIGS. 1A and 2A are fisheye images. The person, or the object, stands on a different position in FIGS. 1A and 2A.

FIGS. 1B and 2B are cutout pictures obtained from the center portion of FIGS. 1A and 2A (approximately dotted-line portion) utilizing perspective projection transformation. In the fisheye image shown in FIG. 1A, the person, or the object, is located approximately in the center. Thus, there is slight distortion (alteration of the object's shape) left in the cutout picture in FIG. 1B which is the perspective projection picture of the fisheye image. The distortion (alteration of the object's shape), however, is not significant. In the fisheye image in FIG. 2A, meanwhile, the person, or the object, is located distant from the center. Thus, the object looks wider in the cutout picture in FIG. 2B which is the perspective projection picture of the fisheye image. Consequently, it is difficult to accurately detect a motion blur amount on the fisheye images in FIGS. 1A and 2A even though matching by picture processing is performed on the images, depending on a position of the object in the fisheye images.

In addition to failing to consider the distortion, Patent Literatures 1 and 2 are inevitably subject to errors, depending on an adopted calculation technique.

Specifically, Patent Literature 1 involves matching based on feature points showing features found on a picture and detectable by picture processing, and minimizing errors of camera vectors calculated out of successfully matched future points. Consequently, the Patent Literature 1 is subject to an error in a correction amount for each of the feature points. The reasons of the error in the correction amount are twofold: (1) A typically used feature-point-extracting algorithm (such as the Lucas-Kanade method and the SIFT method) could cause the reduction in accuracy in calculating feature points for some images, and the positions of the feature points on the object themselves could include errors; (2) It is highly difficult to select the best pair among the group of pairs of successfully matched feature points; and (3) In order to select the best pair, it is necessary to minimize the errors of the calculated camera vectors. The Patent Literature 2 exemplifies the case of utilizing template matching based on feature points. Other than the case where the template matching is performed near the center of an expanded perspective projection image, which shows not much motion blur amount and relatively little effect of distortion, the matching itself might result in a failure since non-liner distortion develops at the feature points in the original fisheye image when a perspective projection image is generated as described above.

Described here is a matching technique based on feature points.

FIGS. 3A to 3D illustrate a matching technique based on feature points. The feature-point-based matching utilizes some of feature points on an object commonly found between two pictures obtained by temporally-continuous capturing. Hereinafter, of the two pictures, the picture captured earlier is referred to as Picture t-1, and the picture captured later is referred to as Picture t.

FIG. 3A illustrates Picture t-1 and Picture t which is captured after Picture t-1. FIG. 3B shows feature points extracted from Picture t-1 and Picture t illustrated in FIG. 3A. FIG. 3C shows characteristic types of the feature points extracted from Picture t-1 and Picture t in FIG. 3B. FIG. 3D shows matching of the feature points extracted from Picture t-1 and Picture t in FIG. 3B. Here, the feature points are characteristic points to be detected by picture processing and found on the picture.

Pixels having greater contrast on Picture t-1 and Picture t in FIG. 3A are selected as the feature points in FIG. 3B. As FIG. 3B shows, some feature points, found on corners and having significantly great contrast, are easily extracted in common from both of the pictures (Picture t-1 and Picture t). Meanwhile, some feature points whose contrast is not so great are not easily extracted from both of the pictures (Picture t-1 and Picture t).

The feature points in FIG. 3B include (i) feature points (feature points indicated in O in FIG. 3C) obtained from a common field between the pictures (Picture t-1 and Picture t) and (ii) feature points (feature points indicated in Δ in FIG. 3C) obtained from the common field between the pictures (Picture t-1 and Picture t) but their positions have shifted between the pictures (Picture t-1 and Picture t). Moreover, some of the feature points in FIG. 3B (feature points indicated in x in FIG. 3C) are obtained from fields not in common between the pictures (Picture t-1 and Picture t). Feature points to be matched among the feature points in FIG. 3B are the ones (feature points indicated in O in FIG. 3C) obtained from the common field between the pictures (Picture t-1 and Picture t).

Before the matching, however, it is impossible to find the positions and the ratio of the number of the feature points obtained from the common field between the pictures (Picture t-1 and Picture t). Hence, it is also impossible to find which feature points are obtained from the common field between the pictures (Picture t-1 and Picture t). Thus, a technique such as the Random Sample Consensus (RANSAC) is used to select pairs of feature points from the feature points extracted from Picture t-1 and the feature points extracted from Picture t, and calculate an evaluation value of each pair of feature points based on a preset evaluation function (FIG. 3D). The evaluation value is designed to be likely to increase when the obtained pair (hereinafter referred to as inlier) of feature points is from the common field between the pictures (Picture t-1 and Picture t)

Specifically, a rotation matrix is calculated based on a combination of two pairs of feature points selected among the feature points extracted from Picture t-1 and the feature points extracted from Picture t. In order to recalculate to find out whether or not the calculated rotation matrix is correct, the calculated rotation matrix rotates feature points included in Picture t-1 and representing other than the feature points of the selected pairs. Then, the rotated feature points in Picture t-1 are checked whether or not the rotated feature points match the feature points in Picture t. In the case where the rotated feature points in Picture t-1 match the feature points in Picture t, the calculated rotation matrix is likely to represent a correct motion blur amount (degree of displacement) between the pictures. Hence, based on a degree of the matching, an evaluation function is set as the evaluation value. Searches are conducted for predetermined times based on the evaluation function. Once the searches are conducted for the predetermined times, the searches are terminated, and the rotation matrix is estimated based on the inlier having the largest evaluation value at the moment of the termination. That is how typical matching is conducted based on the feature points.

It is noted that the inlier is a feature point found in common between pictures, such as the feature points indicated in O in FIG. 3C. Such feature points are obtained mainly from a field in a long-distance view in a captured picture.

As described above, the feature-point-based matching involves the operations below. First, motion blur (displacement) developed between pictures (Picture t-1 and Picture t) is repetitively searched so that the distribution of feature points in Picture t-1 and the distribution of feature points in Picture t match each other as much as possible. Here, the matching feature points in Picture t-1 and Picture t appear in a common field between Picture t-1 and Picture t. Then, a motion blur amount between the pictures (Picture t-1 and Picture t) is estimated as the motion amount that is calculated when the distributions of the feature points (inliers) obtained in the common field between Picture t-1 and Picture t match with each other at the greatest degree.

Furthermore, Patent Literature 2 exemplifies a processing technique of motion blur correction, based on motion detection by a sensor, not based on picture processing; however, even the technique with the use of sensor faces a difficulty in high-accuracy camera-shake correction. Described below is why the problem develops.

In the motion detection, disclosed in Patent Literature 2 and based on a sensor such as a gyroscope, the sensor cannot calculate a correct value in the case where the performance of the sensor (such as sensitivity, dynamic range, and measurement axis) cannot catch up with the motion to be detected. In such a case, the accuracy in motion blur correction decreases. In particular, in the case where a user operates an imaging device while walking, the imaging device suffers from impacts due to his or her walking, and the impact affects the output from the sensor. When the output from the sensor is affected, the value detected as the motion blur amount; that is the sensor output value, is incorrect. Such a detected value makes high-accuracy motion blur correction impossible.

The present invention is conceived in view of the above problems and has an object to implement a picture processing device which calculates in high accuracy a motion blur amount between pictures which are obtained by temporally-continuous capturing, a picture processing method for the picture processing device, a program for the picture processing method, and an imaging device.

Solution to Problem

In order to achieve the above object, a picture processing device according to an aspect of the present invention corrects displacement between pictures obtained by temporally-continuous capturing. The picture processing device includes: a rotational motion amount calculating unit which calculates a rotational motion amount indicating a rotational displacement amount of a second picture with respect to a first picture, the rotational displacement amount being obtained based on a combination of axis rotational directions of mutually perpendicular three axes, and the second picture being captured temporally after the first picture; a cutout picture generating unit which generates a first cutout picture from the first picture and a second cutout picture from the second picture; a parallel motion amount calculating unit which calculates a parallel motion amount indicating a displacement amount of the second cutout picture with respect to the first cutout picture; and a motion amount determining unit which determines, based on the calculated rotational motion amount and the calculated parallel motion amount, a motion amount indicating a displacement amount of the second picture with respect to the first picture, wherein the cutout picture generating unit (i) cuts out from the first picture a predetermined first area, and generates the first cutout picture by performing, based on characteristics of an optical system used for capturing, distortion correction on the predetermined first area which is cut out, and (ii) cuts out from a first corrected picture a second area corresponding to the predetermined first area, and generates the second cutout picture by performing the distortion correction on the corresponding second area which is cut out, the first corrected picture being generated from the second picture whose rotational displacement amount, in the combination of the three-axis rotational directions, is corrected based on the calculated rotational motion amount.

This structure contributes to calculating a motion amount between pictures in two states. Consequently, the structure successfully implements a picture processing device which calculates in high accuracy a motion blur amount between pictures which are obtained by temporally-continuous capturing, as well as reduces an increase in calculation cost. It is noted that, instead of being implemented as a device, the present invention is also implemented as an integrated circuit including processing units for the device, as a method including the processing units for the device as steps, as a program which causes a computer to execute such steps, and as information, data, and signals showing the program. The program, the information, the data, and the signals may be distributed via a recording medium such as a compact disc read-only memory (CD-ROM), and a communications medium such as the Internet.

Advantageous Effects of Invention

The present invention successfully implements a picture processing device which calculates in high accuracy a motion blur amount between pictures obtained by temporally-continuous capturing, a picture processing method for the picture processing device, a program for the picture processing method, and an imaging device. The present invention achieves effects of calculating a motion blur amount in high accuracy and correcting the blur even though pictures are captured in an ultrawide angle, such as fisheye images, and the motion amount between the pictures is so great that the distortion in the pictures cannot be ignored.

BRIEF DESCRIPTION OF DRAWINGS

FIG. 3A illustrates a matching technique based on feature points.

FIG. 3B illustrates the matching technique based on feature points.

FIG. 6 exemplifies a list holding feature points according to Embodiment 1 of the present invention.

FIG. 16 depicts a block diagram showing a structure of a reproducing device according to Embodiment 3 of the present invention.

DESCRIPTION OF EMBODIMENTS

Described hereinafter are embodiments of the present invention, with reference to the drawings.

Embodiment 1

Figure 4:
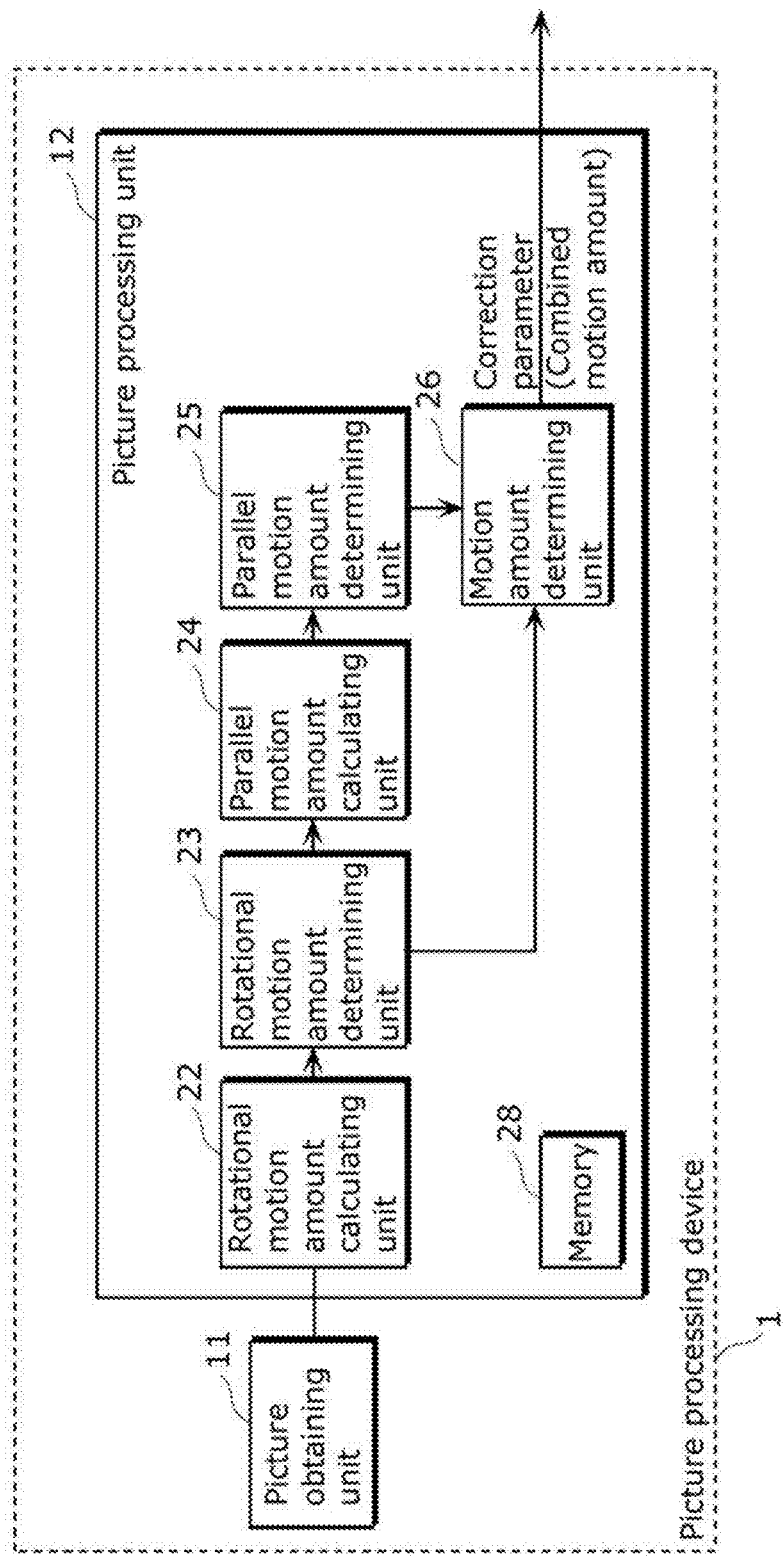
FIG. 4 depicts a block diagram showing a structure of a picture processing device according to Embodiment 1 of the present invention.

FIG. 4 depicts a block diagram showing a structure of a picture processing device according to Embodiment 1 of the present invention.

A picture processing device 1 in FIG. 4 corrects displacement between pictures obtained by temporally-continuous capturing. The picture processing device 1 includes a picture obtaining unit 11 for obtaining picture data to be processed, and a picture processing unit 12 for processing the obtained picture data.

The picture processing unit 12 includes a rotational motion amount calculating unit 22, a rotational motion amount determining unit 23, a parallel motion amount calculating unit 24, a parallel motion amount determining unit 25, a motion amount determining unit 26, and a memory 28.

The rotational motion amount calculating unit 22 obtains picture data to be processed from the picture obtaining unit 11, and calculates a rotational motion amount between the two pictures to be processed (for example, a first picture and a second picture). Specifically, the rotational motion amount calculating unit 22 calculates a rotational motion amount indicating a rotational displacement amount of the second picture with respect to the first picture. The rotational displacement amount is obtained based on the combination of axis rotational directions of mutually-perpendicular three axes. The second picture is captured temporally after the first picture. Here, the rotational displacement amount obtained based on the combination of the axis rotational directions of the mutually-perpendicular three axes is either a rotation angle of the light axis of the optical system used for the capturing or a rotation angle of at least one of the two axes mutually perpendicular to the light axis of the optical system used for the capturing. It is noted that the details of the rotational motion amount calculating unit 22 will be described later, and description of the details shall be omitted here.

The rotational motion amount determining unit 23 determines, before the calculation by the parallel motion amount calculating unit 24, whether or not the rotational motion amount is successfully calculated. Specifically, the rotational motion amount determining unit 23 determines whether the rotational motion amount calculating unit 22 successfully calculates or fails to calculate the rotational motion amount. In the case where the determination result shows that the rotational motion amount is successfully calculated, the rotational motion amount determining unit 23 provides the calculation result to the parallel motion amount calculating unit 24. More specifically, in the case where the determination result shows that the rotational motion amount is successfully calculated, the rotational motion amount determining unit 23 provides the rotational motion amount to the parallel motion amount calculating unit 24. In the case where the determination result shows that calculation of the rotational motion amount fails, the rotational motion amount determining unit 23 provides, to the parallel motion amount calculating unit 24 and the motion amount determining unit 26, the failed rotational motion amount as a zero value indicating that no displacement is found in the combination of the three-axis rotational directions. Then, the rotational motion amount determining unit 23 causes the motion amount determining unit 26 to determine the zero value as a motion amount indicating the displacement amount between the first picture and the second picture.

Here, the failure of calculation includes the following cases where: The rotational motion amount calculating unit 22 misses obtaining a motion amount; even though a motion amount is calculated, the difference between the calculated motion amount and a motion amount calculated before is greater than a predetermined value; and the value of an intermediate parameter obtained during the motion amount calculation is not appropriate. It is noted that the determination standard and the determination technique may be appropriately set based on an allowable error. Thus, the standard and the technique shall not be limited as described above. In the case where calculation of the rotational motion amount fails, the processing executed by the parallel motion amount calculating unit 24 to the motion amount determining unit 26 may be omitted. In such a case, the following technique may be used to set the motion amount between the two pictures for calculating the motion amount:

1. Set the rotational motion amount to 0;
2. Use a rotational motion amount which is successfully calculated before; and
3. Estimate the motion amount by interpolation based on the rotational motion amount successfully calculated before and the rotational motion amount to be successfully calculated next.

Based on the rotational motion amount calculated by the rotational motion amount calculating unit 22, the parallel motion amount calculating unit 24 generates picture data for calculating a parallel motion amount. Then, the parallel motion amount calculating unit 24 calculates the parallel motion amount through parallel motion amount calculating processing. Specifically, the parallel motion amount calculating unit 24 includes a cutout picture generating unit 243. The cutout picture generating unit (i) cuts out from the first picture a predetermined first area, and (ii) generates a first cutout picture by performing, based on characteristics of an optical system used for capturing, on the cutout predetermined first area, distortion correction on the predetermined first area which is cut out. The cutout picture generating unit also (i) cuts out from a first corrected picture a second area corresponding to the predetermined first area, and generates a second cutout picture by performing the distortion correction on the corresponding second area which is cut out. Here, the first corrected picture is generated from the second picture whose rotational displacement amount, in the combination of the three-axis rotational directions, is corrected based on the calculated rotational motion amount. The parallel motion amount calculating unit 24 calculates the parallel motion amount indicating a parallel displacement amount of the second cutout picture with respect to the first cutout picture. Here, the parallel motion amount calculating unit 24 calculates the parallel motion amount in order to reduce an error included in the rotational motion amount; that is, a residual between the positions of the two pictures to be processed. It is noted that the details of the parallel motion amount calculating unit 24 will be described later, and description of the details shall be omitted here.

The parallel motion amount determining unit 25 determines, after the calculation by the parallel motion amount calculating unit 24, whether the parallel motion amount is successfully calculated or failed to be calculated. Specifically, in the case where the determination result shows that the parallel motion amount is successfully calculated, the parallel motion amount determining unit 25 provides the calculated parallel motion amount to the motion amount determining unit 26. In contrast, in the case where the determination result shows that calculation of the parallel motion amount fails, the parallel motion amount determining unit 25 provides, to the motion amount determining unit 26, the parallel motion amount as a zero value indicating that no parallel displacement is found.

Here, the failure of calculation includes the following cases where: The parallel motion amount calculating unit 24 misses obtaining a parallel motion amount; even though a parallel motion amount is calculated, the difference between the calculated parallel motion amount and a parallel motion amount calculated before is greater than a predetermined value; and the value of an intermediate parameter obtained during the parallel motion amount calculation is not appropriate.

Based on the calculated rotational motion amount and the calculated parallel motion amount, the motion amount determining unit 26 determines a motion amount indicating a displacement amount of the second picture with respect to the first picture. Specifically, the motion amount determining unit 26 determines, as the motion amount, a combined motion amount having the calculated rotational motion amount and the calculated parallel motion amount combined with each other. Specifically, the motion amount determining unit 26 combines the rotational motion amount provided from the rotational motion amount determining unit 23 and the parallel motion amount provided from the parallel motion amount determining unit 25, and consequently determines a correction parameter corresponding to a motion blur amount (displacement amount) of the two pictures.

In the case where the parallel motion amount determining unit 25 determines that the parallel motion amount calculating unit 24 fails to calculate the parallel motion amount, the motion amount determining unit 26 sets the parallel motion amount to 0, and sets the rotational motion amount calculated by the rotational motion amount calculating unit 22 to a motion amount (final correction parameter) indicating the displacement amount between the first picture and the second picture. Furthermore, in the case where the rotational motion amount determining unit 23 determines that the rotational motion amount calculating unit 22 fails to calculate the rotational motion amount, the motion amount determining unit 26 determines, as the zero value, the motion amount (final correction parameter) indicating the displacement amount between the first picture and the second picture.

That is how the picture processing device 1 is structured.

Described next is a detailed structure of the rotational motion amount calculating unit 22.

Figure 5:
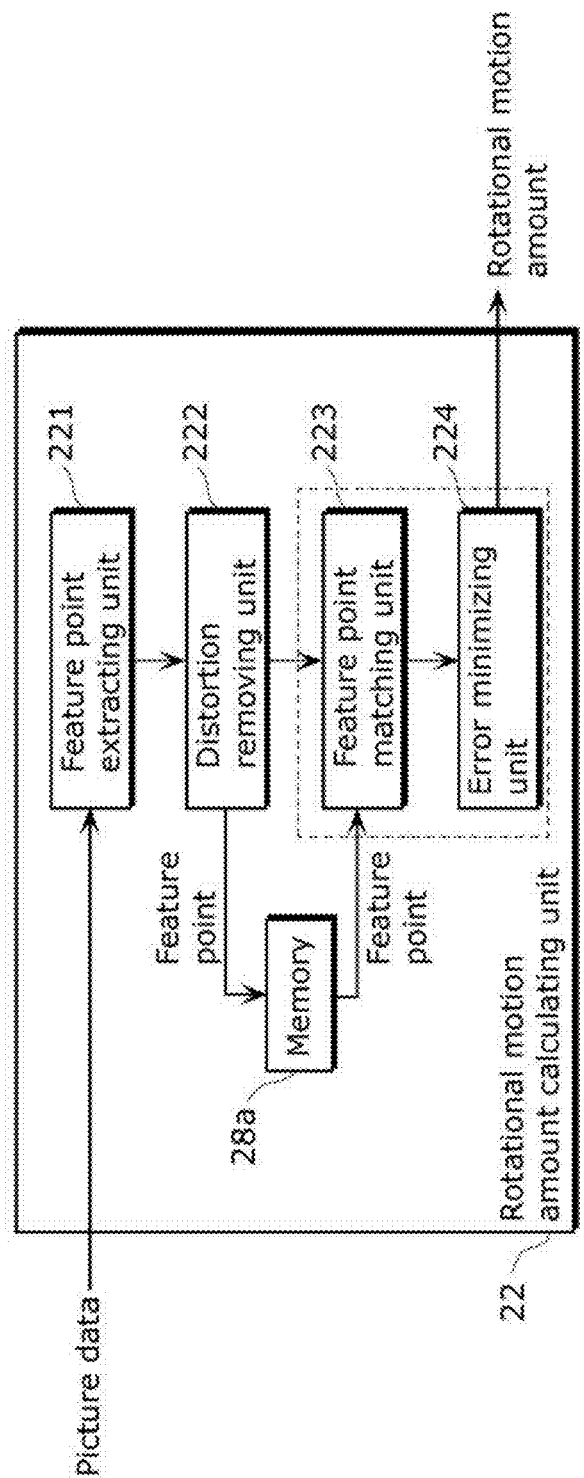
FIG. 5 depicts a block diagram exemplifying a detailed structure of a rotational motion amount calculating unit according to Embodiment 1 of the present invention.

FIG. 5 depicts a block diagram exemplifying a detailed structure of the rotational motion amount calculating unit 22 according to Embodiment 1 of the present invention.

As FIG. 5 shows, the rotational motion amount calculating unit 22 includes a feature point extracting unit 221, a distortion removing unit 222, a feature point matching unit 223, an error minimizing unit 224, and a memory 28a.

Described here is the case where a rigid model is defined, and a motion amount indicating a motion blur amount (displacement amount) found between two pictures is expressed by rotations of three axes set to the rigid body. Furthermore, the items for at least one calculation of the motion amount, which are the picture data used for the calculation of the motion amount, the calculation result, and various parameters, are recorded on the memory 28a in FIG. 28a and the not-shown memory 28. Those items are reusable as necessary.

Figure 1A:
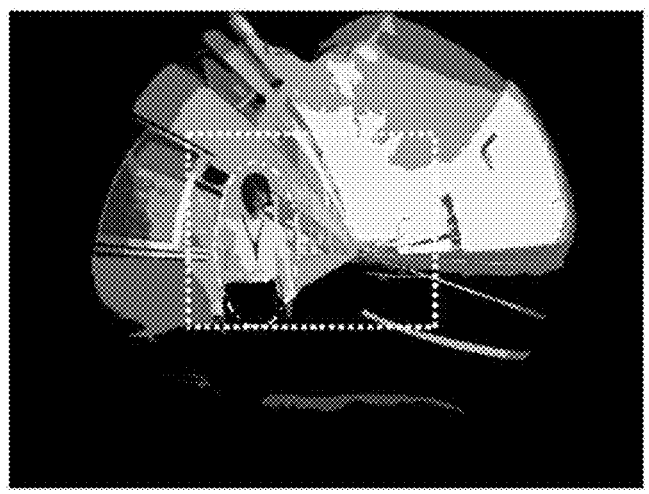
FIG. 1A shows how an object in a cutout picture distorts due to a position of an object in a fisheye image.
Figure 1B:
FIG. 1B shows how an object in a cutout picture distorts due to a position of an object in a fisheye image.
Figure 2A:
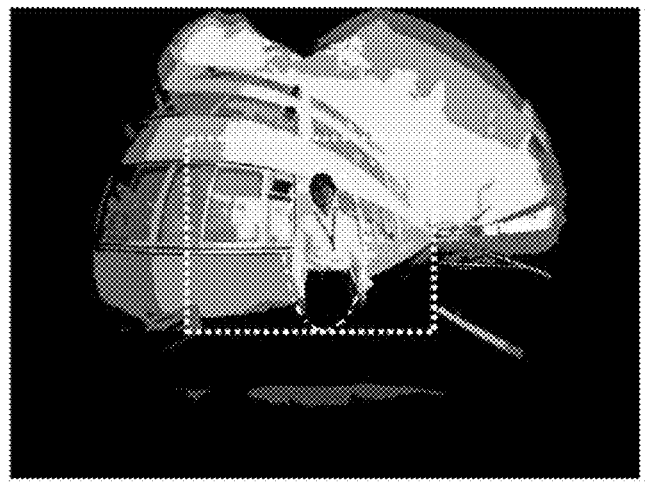
FIG. 2A shows how an object in a cutout picture distorts due to a position of an object in a fisheye image.
Figure 2B:
FIG. 2B shows how an object in a cutout picture distorts due to a position of an object in a fisheye image.
Figure 3C:
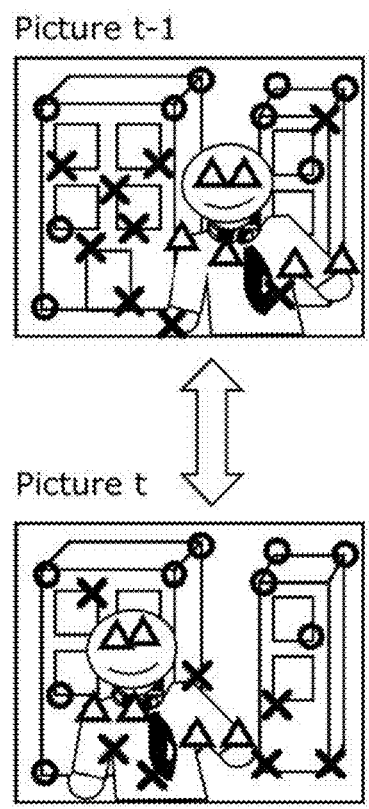
FIG. 3C illustrates the matching technique based on feature points.

The feature point extracting unit 221 extracts feature points from each of the first picture and the second picture. Specifically, the feature point extracting unit 221 analyses provided picture data to extract the feature points and to calculate the coordinates and the feature amounts of the feature points. The technique to extract the feature points is shown in FIGS. 3A and 3B, and the details thereof shall be omitted here. The technique may also calculate the feature points based on part of the area, instead of on the entire area in the picture. Furthermore, the feature point extracting unit 221 records the extracted feature points on a list for holding a feature amount for each of the feature points as shown in FIG. 6. The list is held in the not-shown memory 28. FIG. 6 exemplifies a list holding feature points according to Embodiment 1 of the present invention.

In FIG. 6, Coordinate indicates an orthogonal coordinate system having the upper-left corner of the picture as the origin, Feature Amount indicates a Harris value, and Spherical Coordinate indicates, as described later, coordinates after distortion is corrected. In addition, Neighboring Feature indicates a contrast between a target pixel and an average of neighboring pixels, a difference value or a ratio such as an intensity (luminance) and color difference, a direction of a gradient vector of a target pixel, and a vector intensity. It is noted that the feature amount for each of the feature points is not limited to the one shown in FIG. 6. Any feature amount is applicable as far as the feature amount is available for feature point matching. In order to balance calculation cost and accuracy, the feature amounts may be sorted, and only the first 100 feature points may be used, instead of using all of the calculated feature points.

The distortion removing unit 222 removes optical distortion due to optical strain caused by the optical system and found between the feature point of the first point and the feature point of the second picture. Here, the feature points are extracted by the feature point extracting unit 221. Specifically, the distortion removing unit 222 removes optical distortion between the feature points of the first picture and the feature points of the second picture by correcting displacement which has developed due to the optical strain of the optical system used for capturing the first and second pictures whose feature points are extracted by the feature point extracting unit 221. More specifically, the distortion removing unit 222 corrects the coordinates of the extracted feature points based on the rigid model. In other words, the distortion removing unit 222 removes a distortion of an object in the picture by expanding (mapping on a spherical surface), to a three-dimensional space, the feature points found on the picture (two dimension) and extracted by the feature point extracting unit 221. Described hereinafter is how the distortion is removed.

Figure 7:
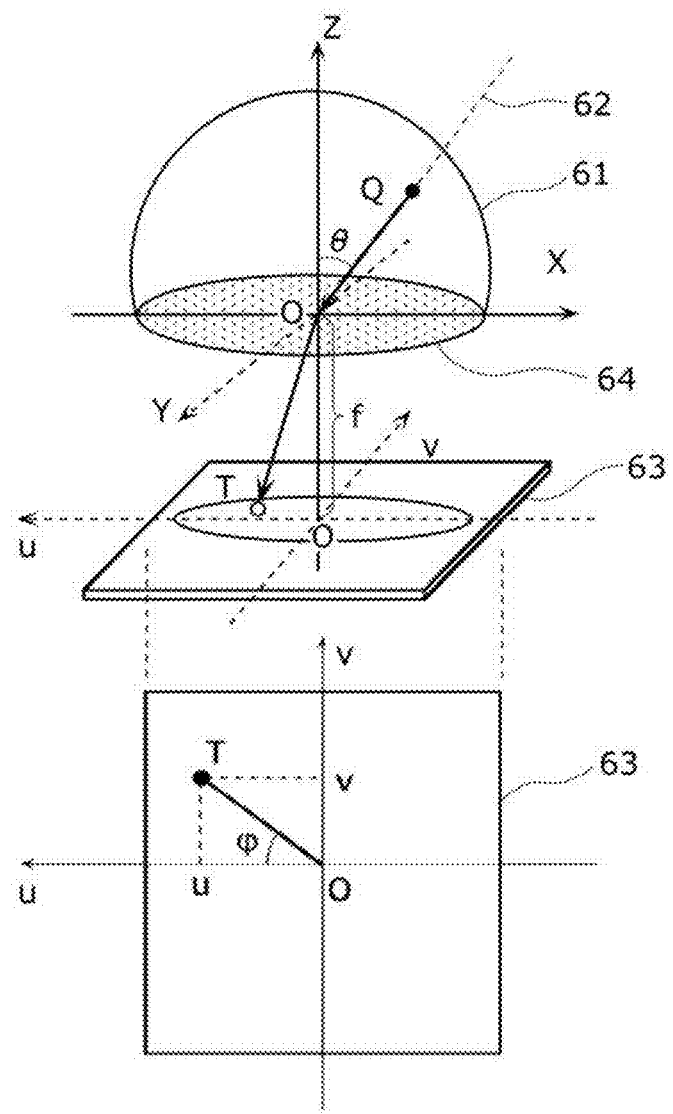
FIG. 7 shows how to correct distortion based on a picture surface, incident light, and sphere matching.

FIG. 7 shows how to correct distortion based on a picture surface, incident light, and sphere matching.

As FIG. 7 shows, light 62, which arrives at an image data plane 63 (an image sensor, for example) through a lens 64, is intended to be emitted at Point Q on a virtual spherical surface 61. When the lens 64 in use is a stereographic projection lens, for example, a relationship to satisfy Expression 1 is found between Point Q and Point T (u,v) on the image data plane 63 where f is the focal length, and θ is the angle formed between OQ and Z-axis which is the light axis of the lens 64. Then, when Expression 1 is deformed, θ is expressed as shown in Expression 2.

$$\sqrt{(u^2+v^2)}=2f*\tan(\theta/2) \quad \text{(Expression 1)}$$

$$\theta=2*\arctan((\sqrt{(u^2+v^2)})/2f) \quad \text{(Expression 2)}$$

Here, φ is the angle formed between Point T (u,v) and the u-axis on the u-v plane. The angle φ is expressed by Expression 3. Here, R is the radius of the virtual spherical surface 61. The coordinates of Point Q on the virtual spherical surface 61 can be obtained by Expression 4 based on Expressions 2 and 3.

$$\phi=\arctan(v/u) \quad \text{(Expression 3)}$$

$$Q(x,y,z)=(R*\sin\theta\cos\phi, R*\sin\theta\sin\phi, R*\cos\theta) \quad \text{(Expression 4)}$$

It is noted that, for the sake of simplicity, the virtual spherical surface 61 may be a unit sphere having the radius of 1.

The picture data obtained when an object is captured is originally a cut-out three-dimensional space projected on a two dimensional plane. Thus, the coordinates of the feature points can be expanded in the three-dimensional space (mapping on spherical surface) according to Expressions 1 to 4. Moreover, the expansion of the coordinates of the feature points in the three-dimensional space makes it possible to remove an image distortion developed due to projection of the cut-out three-dimensional space on the two-dimensional plane, and found on the image data plane 63.

It is noted that, actually, the distortion removing unit 222 corrects the coordinates of the extracted feature points according to the rigid model, by recording, on the list shown in FIG. 6, corrected three-dimensional space coordinates, and storing the list in the memory 28a.

The memory 28a holds feature point data used for at least the previous calculation of the rotational motion amount. The feature point data is read as information on the first picture. It is noted that the memory 28a does not have to be included in the rotational motion amount calculating unit 22. Instead, the memory 28a may be part of the memory 28.

The feature point matching unit 223 matches the feature point of the second picture with the feature point of the first picture. Here, the first picture and the second picture have optical distortion removed by the distortion removing unit 222. Specifically, the feature point matching unit 223 receives the feature points of the first picture and the feature points of the second picture, matches the feature points of the second picture with the feature points of the first picture, and calculates the rotational motion amount (for example, displacement amount in the axis rotational directions of the three axes such as an angle of rotation) between the two pictures.

Figure 8A:
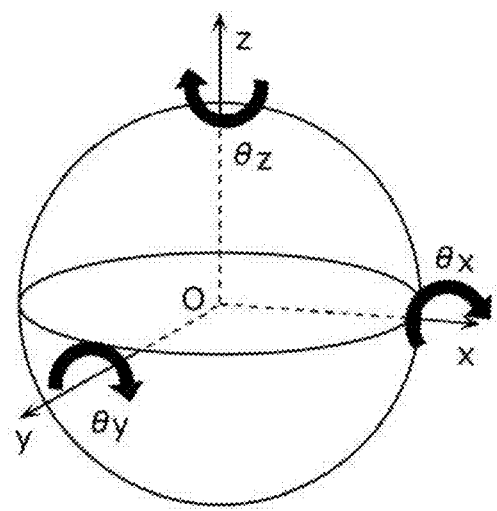
FIG. 8A shows how to perform rotational positioning (matching) using a rigid model.
Figure 8B:
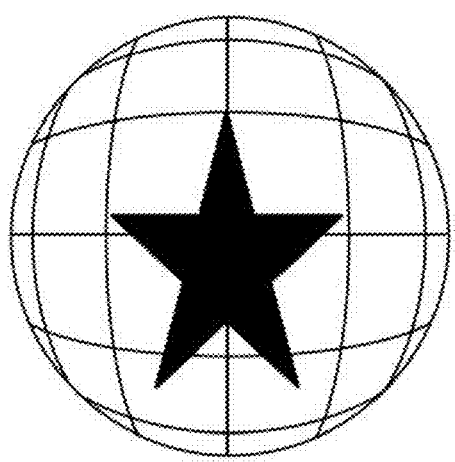
FIG. 8B shows how to perform rotational positioning (matching) using a rigid model.
Figure 8C:
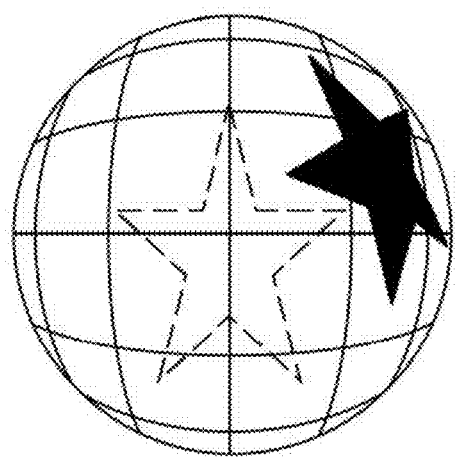
FIG. 8C shows how to perform rotational positioning (matching) using a rigid model.

Exemplified here is rotational positioning (matching) using the rigid model. FIGS. 8A to 8C show how to perform rotational positioning (matching) using the rigid model.

Exemplified in FIG. 8A are three axes mutually perpendicular to a sphere which is an example of the rigid body, and each of θx, θy, θz represents a corresponding one of the rotational amount of the three axes. Here, a rotational amount obtained based on the combination of the mutually-perpendicular three axes is a typical example of a displacement amount extending in the combination of the three-axis rotational directions. Furthermore, FIGS. 8B and 8C exemplify the case where objects (stars in the drawings) in the same shape and size are placed in a different location on the spherical surface. With the use of the rigid model, the locations of the objects in FIGS. 8 and 9 can match with each other when each of the axes is rotated at least once.

Hence, the feature point matching unit 223 matches the locations ob the objects through a rotation of each axis to calculate the displacement amount (rotational motion amount) in the combination of three-axis rotational directions.

It is noted that any matching is applicable as far as the motion amounts of two pictures are used as feature points. Thus, the matching shall not be limited by the example in FIG. 8. For example, the RANSAC matching may be used as the matching.

The error minimizing unit 224 calculates a rotational motion amount based on a pair of (i) a feature point of the first picture and (ii) a feature point of the second picture corresponding to the feature point of the first picture, so that the error minimizing unit 224 minimizes an error made when the displacement found in the second picture and extending in the combination of the rotational directions of the three axes is to be corrected. Here, the feature points are successfully matched with each other by the feature point matching unit 223.

Figure 3D:
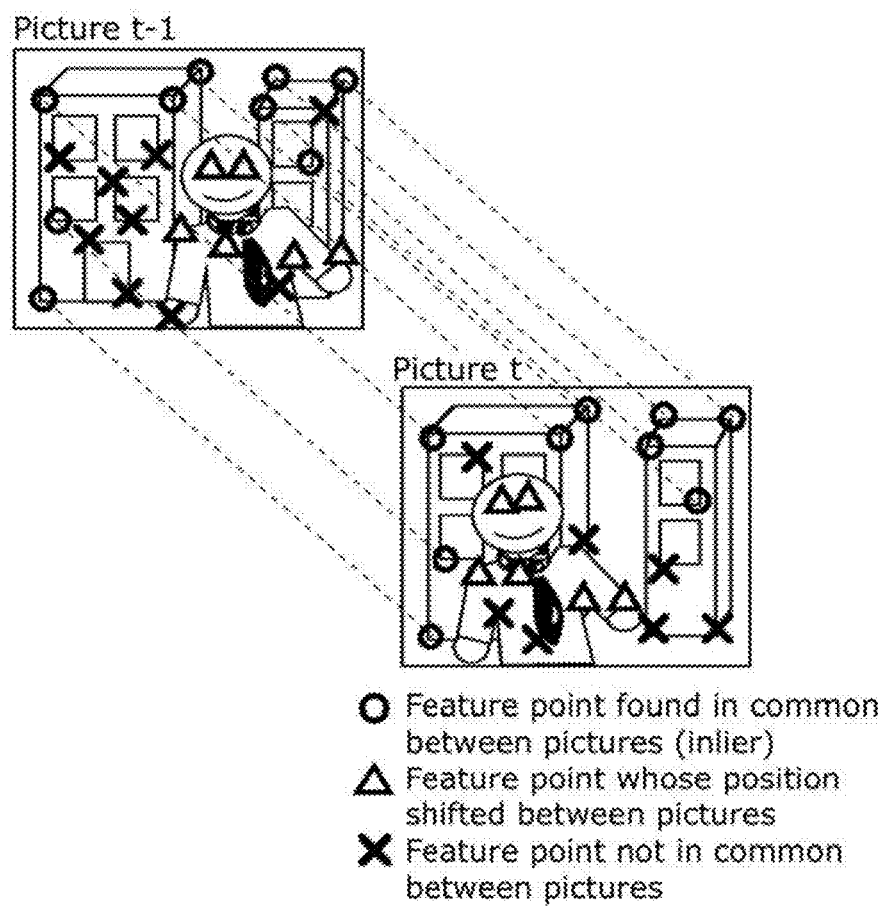
FIG. 3D illustrates the matching technique based on feature points.

In general, as shown in FIG. 3D, there are successfully matching-multiple pairs (inliers) each of which includes a pair of feature points each included in a corresponding one of the two pictures. Based on the inliers, a kind of averaging is performed so that the sum of errors developed in using the inliers is minimized. The error minimizing unit 224 performs such averaging. The processing performed by the error minimizing unit 224 is based on the Levenberg-Marquardt algorithm, the Gradient method, and averaging.

The error minimizing unit 224 performs the above processing to calculate the rotational motion amount indicating the rotational displacement amount extending in the combination of the three-axis rotational directions. Specifically, the error minimizing unit 224 calculates a rotation matrix R_rot indicating a rotational motion amount, and, based on the rotation matrix R_rot, obtains the rotational motion amount (θx, θy, θz) in the combination of the three-axis rotational directions.

It is noted that the error minimizing unit 224 does not have to be provided after the feature point matching unit 223, as shown in FIG. 5. The error minimizing unit 224 may be included in the feature point matching unit 223 as far as the error minimizing unit 224 performs the above processing.

That is how the rotational motion amount calculating unit 22 is structured.

Described next is a detailed structure of the parallel motion amount calculating unit 24.

Figure 9:
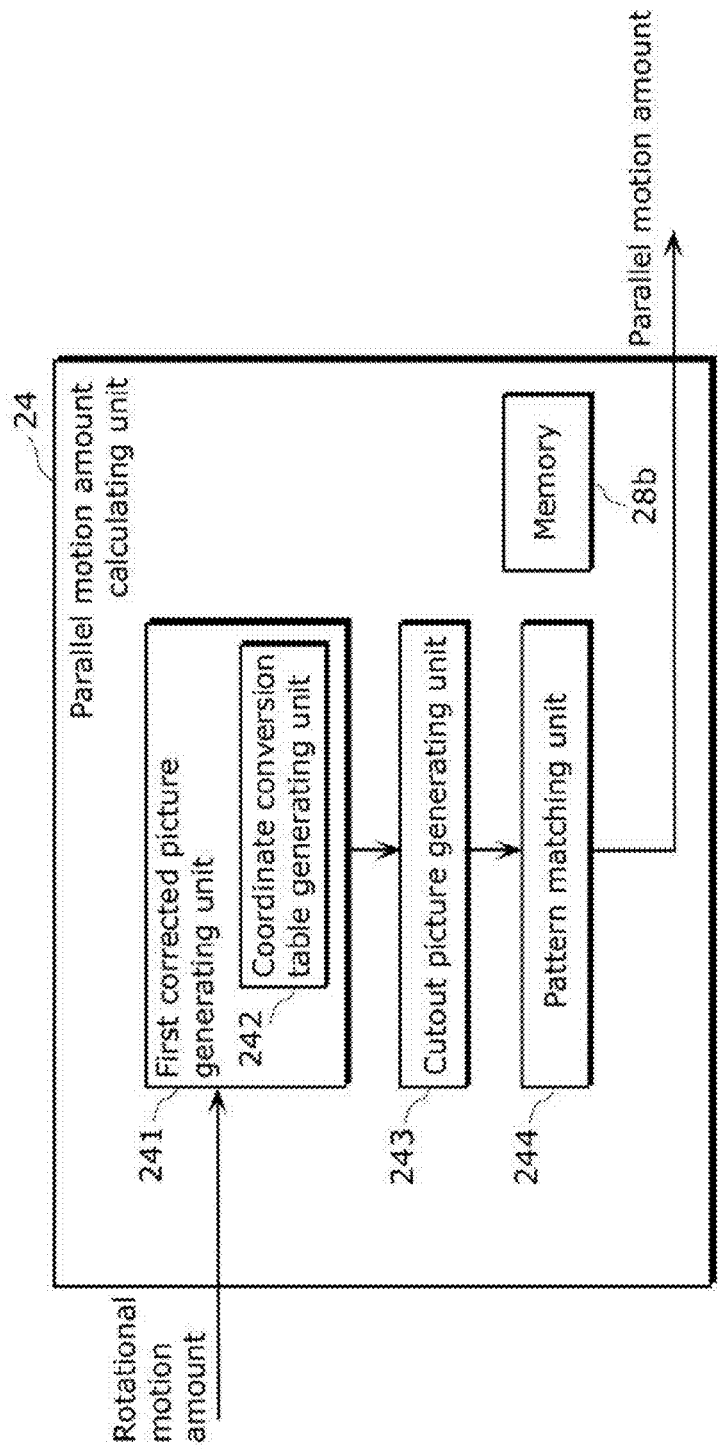
FIG. 9 depicts a block diagram exemplifying a detailed structure of a parallel motion amount calculating unit according to Embodiment 1 of the present invention.

FIG. 9 depicts a block diagram exemplifying a detailed structure of the parallel motion amount calculating unit 24 according to Embodiment 1 of the present invention.

As shown in FIG. 9, the parallel motion amount calculating unit 24 includes a first corrected picture generating unit 241, a cutout picture generating unit 243, a pattern matching unit 244, and a memory 28b. Assumed here is the case where a rotational motion amount is successfully calculated.

Based on the calculated rotational motion amount, the first corrected picture generating unit 241 generates the first corrected picture from the second picture whose rotational displacement amount in the combination of the three-axis rotational directions is corrected. Furthermore, the first corrected picture generating unit 241 includes a coordinate transformation table generating unit 242. The first corrected picture generating unit 241 causes the coordinate transformation table generating unit 242 to generate a coordinate transformation table, and generates the first corrected picture based on the coordinate transformation table generated by the coordinate transformation table generating unit 242.

Based on the calculated rotational motion amount, the coordinate transformation table generating unit 242 generates a coordinate transformation table indicating the correspondence between each of the pixels in the first corrected picture and an associated one of the pixels in the second picture. Specifically, when the first corrected picture generating unit 241 generates the first corrected picture after the second picture is rotated on the spherical surface based on the rotational motion amount, the coordinate transformation table generating unit 242 generates the coordinate transformation table indicating the correspondence between each of the pixels in the first corrected picture and an associated one of the pixels in the second picture.

More specifically, the coordinate transformation table generating unit 242 obtains three-dimensional space expansion data of the first corrected picture by applying the rotation matrix R-rot to the second picture expanded in the three-dimensional space (spherical surface); that is, by rotating the second picture in the three-dimensional space. The coordinate transformation table generating unit 242 transforms the obtained three-dimensional space expansion data of the first corrected picture and three-dimensional space expansion data of the second picture so that the data of the first corrected picture and the second picture corresponds to an incident direction of corresponding light and positions of pixels in each of the picture planes. Then, the coordinate transformation table generating unit 242 generates a coordinate transformation table describing the positional relationship between the first corrected picture and the second picture. Then, based on the coordinate transformation table generated by the coordinate transformation table generating unit 242, the first corrected picture generating unit 241 generates the first corrected picture generated from the second picture whose rotational motion amount is corrected, and records the first corrected picture on the memory 28b.

The cutout picture generating unit 243 (i) cuts out from the first picture the predetermined first area, and (ii) generates the first cutout picture by performing, based on characteristics of an optical system used for capturing, distortion correction on the predetermined first area which is cut out. The cutout picture generating unit 243 also (i) cuts out from the first corrected picture the second area corresponding to the predetermined first area and (ii) generates the second cutout picture by performing the distortion correction on the corresponding second area which is cut out. Here, the distortion correction is based on characteristics of the optical system used for the capturing. Specifically, the cutout picture generating unit 243 generates perspective projection pictures for the predetermined first area and for the corresponding second area for performing the distortion correction on the predetermined first area and the corresponding second area so as to generate the first cutout picture and the second cutout picture.

In other words, the cutout picture generating unit 243 cuts out, from the first picture and the first corrected picture, predetermined sizes of the perspective projection images that are previously set, and generates the first cutout picture and the second cutout picture both of which receive the distortion correction based on the characteristics of the optical system used for capturing.

It is noted the cut out perspective projection images may be recorded in the memory 28b for reuse.

Furthermore, in generating the second cutout picture, the coordinate transformation table may include the data for correcting rotational motion amounts and characteristics of the optical system in use, and the second picture may be obtained before the first corrected picture. Here, the coordinate transformation table generating unit 242 is included in the cutout picture generating unit 243. Furthermore, a picture generated according to the coordinate transformation table is a perspective projection image whose rotational motion amount and optical strain are corrected. Thus, the first corrected picture generating unit 241 is not necessary.

The phase when the cutout picture generating unit 243 generates the first cutout picture and the second cutout picture is the phase when the positioning is performed based on the rotational motion amount. Here, when the accuracy of the rotational motion amount is high enough, the two pictures (the first cutout picture and the second cutout picture) are very similar to each other. Such a case implies that a parallel motion amounts on the image plane is approximated with the rotational motion amount set for the rigid model, so that the rotation of a light axis through a cutout picture (plane) and the parallel motion can be corrected. As described above, however, the error minimizing unit 224 is at the last stage of calculating the rotational motion amount, and obtains the result of total optimization performed over the entire picture. Thus, motion amount correction is not always optimized when performed on a cutout picture to be used for display and viewing and listening. Hence, the pattern matching unit 244 is used for performing pattern matching to minimize an error found between the cutout pictures; that is, the error found between the first cutout picture and the second cutout picture generated by the cutout picture generating unit 243.

The pattern matching unit 244 performs pattern matching on the two perspective projection images (the first cutout picture and the second cutout picture) cut out from the first picture and the first corrected picture, respectively, and calculates a parallel motion amount found between the two cutout pictures. Specifically, the parallel motion amount calculating unit 24 calculates, based on mutually-perpendicular three axes with respect to the first cutout picture, the parallel displacement amount of the second cutout picture with respect to the first cutout picture so as to obtain the parallel motion amount. Here, the parallel displacement amount extends in at least one of directions in the mutually-perpendicular three axes.

It is noted that the pattern matching is not the only technique to calculate the parallel motion amount. For example, object matching or feature point matching may be used for the calculation. Furthermore, for example, used for the calculation may be: the Phase Only Correlation (POC) technique, the optical flow technique, and a template matching technique which involves further cutting out part of one of the cutout pictures and using the part as a template.

That is how the parallel motion amount calculating unit 24 is structured.

Then, the parallel motion amount calculating unit 24 structured above calculates a parallel motion amount indicating a parallel displacement amount of the second cutout picture with respect to the first cutout picture. Specifically, the parallel motion amount calculating unit 24 calculates delta=($\Delta u$, $\Delta v$) indicating a parallel motion amount.

It is noted that, for the sake of simplification, the above description mentioned the case where the matching is performed only in the direction of the mutually-perpendicular two axes on the image plane; furthermore, the matching may be performed in a z-direction perpendicular to the image plane. Matching in the z-direction is equivalent to changing the size of an object on the image plane; that is, to changing zoom magnification. In other words, the parallel motion amount calculating unit 24 calculates the parallel motion amount of the second cutout picture with respect to the first cutout picture as the value indicating a magnification percentage or a reduction percentage of the second cutout picture with respect to the first cutout picture, using one of the mutually-perpendicular three axes with respect to the first cutout picture as an axis perpendicular to the first cutout picture. Here, the parallel motion amount extends in a direction of axis perpendicular to the first cutout picture.

It is noted that the memory 28a does not have to be included in the parallel motion amount calculating unit 24. Instead, the memory 28a may be part of the memory 28.

Furthermore, the motion amount determining unit 26, for example, combines the rotation matrix R_rot and the delta calculated by the parallel motion amount calculating unit 24, and consequently determines a correction parameter (combined motion amount) corresponding to the motion blur amount (displacement amount) between the two images (the first image and the second image).

Figure 10:
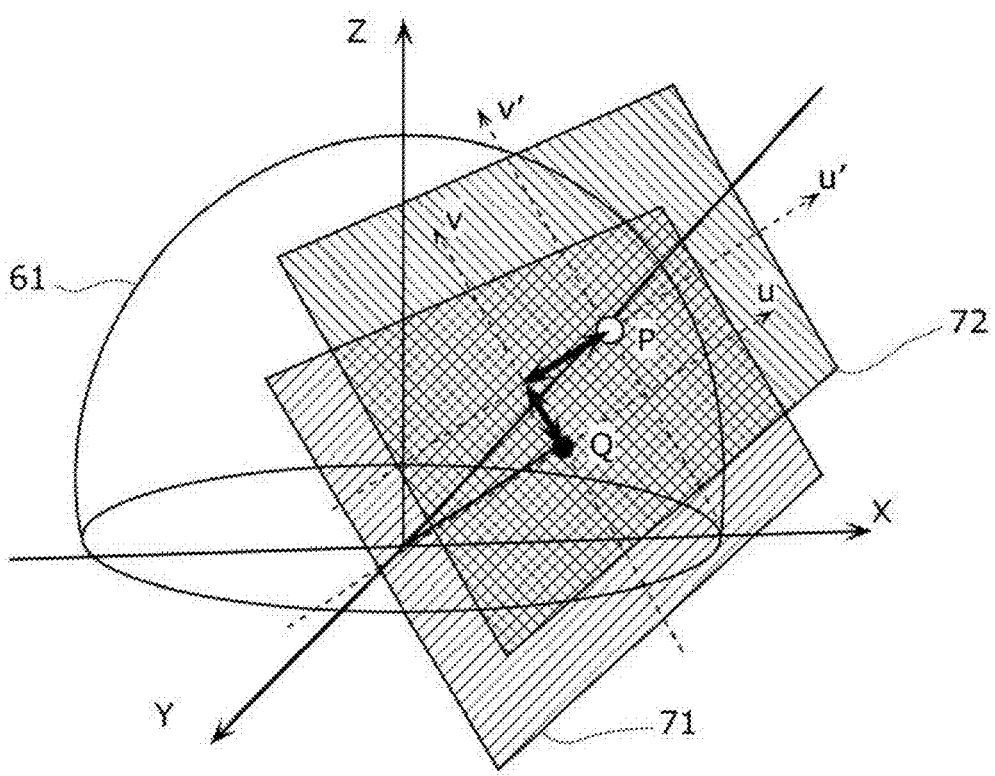
FIG. 10 shows combining processing by a motion amount determining unit according to Embodiment 1 of the present invention.

Described hereinafter is the reason why the motion amount determining unit 26 determines the motion amount (final correction parameter) in the case where both the rotational motion amount calculating unit 22 and the parallel motion amount calculating unit 24 succeed in the calculation. FIG. 10 shows an image having displacement corrected between images based on a correction parameter according to Embodiment 1 of the present invention.

A cutout picture 71 in FIG. 10 is cut out from the first corrected picture generated from the second picture whose rotational displacement amount, in the combination of the three-axis rotational directions with respect to the first picture, is corrected, based on the rotation matrix R_rot indicating the rotational motion amount. A cutout picture 72 in FIG. 10 is generated from the second picture whose displacement, extending in the combination of the three-axis rotational directions with respect to the first picture, is corrected, based on the correction parameter (combined motion amount) having the rotation matrix R_rot indicating the rotational motion amount and the delta indicating the parallel motion amount combined with each other.

In other words, the cutout picture 72 is obtained from the cutout picture 71 receiving a correction by the delta. The correction by the delta is to move parallel Point Q(u,v) on the cutout picture 71 by (Δu,Δv) to Point P (u+Δu, v+Δv). The correction by the delta is applied to all the pixels of the cutout picture 71. Consequently, the generated picture has the corrected motion blur amount (displacement) between the pictures, based on the parallel-moved cutout picture 72; that is, the correction parameter.

As described above, the separate application of the rotation matrix R_rot indicating the rotational motion amount and the delta indicating the parallel motion amount makes it possible to correct the displacement (motion blur amount between images) of the second picture to the first picture. Hence, the motion amount; that is the final correction parameter, is successfully calculated by combining the rotational motion amount and the parallel motion amount with each other. This means that the point of origin (the center of expansion) when the cutout picture 71 is generated is moved by the delta, and a previously-generated coordinate transformation table can be reused.

Furthermore, the coordinate transformation which involves rotation is not linear in general. Thus, when a parameter changes, the table needs to be recalculated. The picture processing device 1 according to Embodiment 1 combines a rotation and a parallel motion for the correction of a motion blur amount between the images, which contributes to eliminating the need for recalculating the table. It is noted that the delta may be transformed into a rotational motion amount obtained based on the combination of the three-axis rotational directions by Expression 1, and the coordinate transformation table is recalculated, so that the rotational motion amount may be combined with the parallel motion amount. Here, extra calculation cost is required for the recalculation of the table.

Described next is the operation of the picture processing device 1 structured above.

Figure 11:
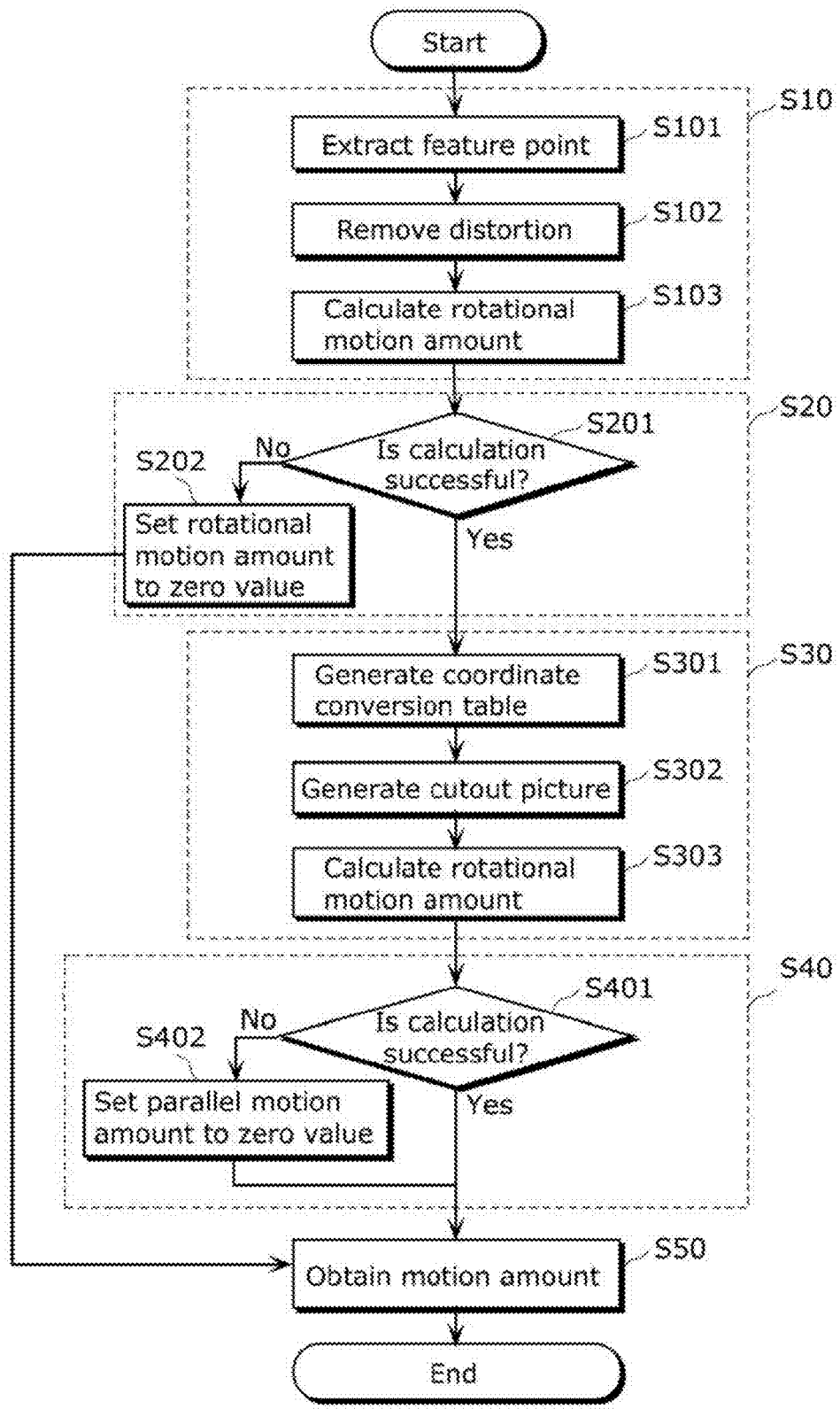
FIG. 11 depicts a flowchart showing an operation of the picture processing device according to Embodiment 1 of the present invention.

FIG. 11 depicts a flowchart showing an operation of the picture processing device 1 according to Embodiment 1 of the present invention.

First, the picture processing device 1 causes the picture obtaining unit 11 to obtain image data to be processed.

Then, the rotational motion amount calculating unit 22 obtains the picture data to be processed from the picture obtaining unit 11, and calculates a rotational motion amount found between the two pictures (for example, a first picture and a second picture) to be processed (S10). Specifically, the feature point extracting unit 221 extracts feature points from each of the first picture and the second picture (S101). Then, the distortion removing unit 222 removes optical distortion caused by optical strain of an optical system used for capturing the first and second pictures whose feature points are extracted by the feature point extracting unit 221 (S102). Then, the feature point matching unit 223 matches the feature points of the first picture with the feature points of the second picture to calculate a rotational motion amount between the first picture and the second picture (S103). Here, the first picture and the second picture have the optical strain removed by the distortion removing unit 222.

Next, the rotational motion amount determining unit 23 determines whether or not the rotational motion amount is successfully calculated (S20). Specifically, the rotational motion amount determining unit 23 determines whether the rotational motion amount calculating unit 22 successfully calculates or fails to calculate the rotational motion amount (S201). In the case where the determination result shows that the rotational motion amount is successfully calculated (S201: Yes), the rotational motion amount determining unit 23 provides the calculation result to the parallel motion amount calculating unit 24. Meanwhile, in the case where the determination result shows that the rotational motion amount is failed to be calculated (S201: No), the rotational motion amount determining unit 23 provides, to the parallel motion amount calculating unit 24 and the motion amount determining unit 26, the failed rotational motion amount as a zero value indicating no displacement is found in the combination of the three-axis rotational directions (S202).

Based on the rotational motion amount calculated by the rotational motion amount calculating unit 22, the parallel motion amount calculating unit 24 generates picture data for calculating a parallel motion amount. Then, the parallel motion amount calculating unit 24 calculates the parallel motion amount through parallel motion amount calculating processing (S30). Specifically, based on the calculated rotational motion amount, the coordinate transformation table generating unit 242 generates a coordinate transformation table indicating the correspondence between each of the pixels in a first corrected picture and an associated one of the pixels in the second picture (S301). Based on the coordinate transformation table generated by the coordinate transformation table generating unit 242, the first corrected picture generating unit 241 generates a first corrected picture generated from the second picture whose rotational motion amount in the axis rotational direction of the three axes is corrected (S302). Then, the cutout picture generating unit 243 generates perspective projection pictures for the predetermined first area and for the corresponding second area so as to generate the first cutout picture and the second cutout picture. (S303). Then, the pattern matching unit 244 performs pattern matching on the two perspective projection images (the first cutout picture and the second cutout picture) cut out from the first picture and the first corrected picture, respectively, and calculates a parallel motion amount found between the two cutout pictures (S304).

Next, the parallel motion amount determining unit 25 determines whether the parallel motion amount is successfully calculated or is failed to be calculated (S40). Specifically, the parallel motion amount determining unit 25 determines whether the parallel motion amount is successfully calculated or failed to be calculated (S401). In the case the determination result shows that the parallel motion amount is successfully calculated (S401: Yes), the parallel motion amount determining unit 25 provides the calculated parallel motion amount to the motion amount determining unit 26. In contrast, in the case where the determination result shows that the parallel motion amount is failed to be calculated (S401: No), the parallel motion amount determining unit 25 provides, to the motion amount determining unit 26, the parallel motion amount as a zero value (S402) indicating no parallel displacement is found.

Based on the calculated rotational motion amount and parallel motion amount, the motion amount determining unit 26 determines a motion amount indicating a displacement amount of the second picture with respect to the first picture (S50).

As described above, the picture processing device 1 determines a motion amount which is a correction parameter for correcting displacement between pictures obtained by temporally-continuous capturing.

Then, based on the determined motion amount, the picture processing device 1 generates a corrected picture having corrected displacement between the pictures obtained by the temporally-continuous capturing.

As described above, Embodiment 1 makes it possible to implement a picture processing device which calculates in high accuracy a motion blur amount between pictures which are obtained by temporally-continuous capturing, and a picture processing method for the device. For example, the picture processing device and the picture processing method successfully calculate in high accuracy a motion blur amount, even though a conventional technique has had a difficulty in calculating a blur amount for an ultrawide image, such as a fisheye image. Based on the determined motion blur amount, the device and the method successfully improve quality of images in viewing and listening. In other words, the picture processing device and the picture processing method achieve effects of calculating a motion blur amount in high accuracy and correcting the blur even though pictures are captured in an ultrawide angle, such as fisheye images, and the motion amount between the pictures is so great that the distortion in the pictures cannot be ignored.

It is noted that the picture processing device according to Embodiment 1 is a preferable example of application since the device achieves significant effects on images captured in an ultrawide angle, such as fisheye images; however, the picture processing device shall not be limited to such an example. The picture processing device can be used for capturing images having a regular angle of view, such as an angle equal to 70 degrees or less. In such a case, at least more than 50% of an area should be shared between the first and second pictures. Thus, the picture processing device achieves the effect on the condition that the picture processing device is used in capturing in a regular angle of view, with its camera shake reduced further than in capturing in the ultrawide angle. Furthermore, when applied on images including ultrawide images, such as fisheye images, and images having a regular angle of view, the motion blur detection technique based on an implementation of the present invention requires optical parameters (such as a projection technique, a focal length, the size of an image sensor, and the number of pixels).

Moreover, the picture processing device 1 may include a corrected picture generating unit which generates, based on a correction parameter (combined motion amount) determined by the motion amount determining unit 26, a corrected picture from the second picture whose displacement is corrected. Here, the displacement is found between multiple pictures which are obtained by temporally-continuous capturing. In such a case, the corrected picture generated by the corrected picture generating unit may be held in the memory 28.

Figure 12:
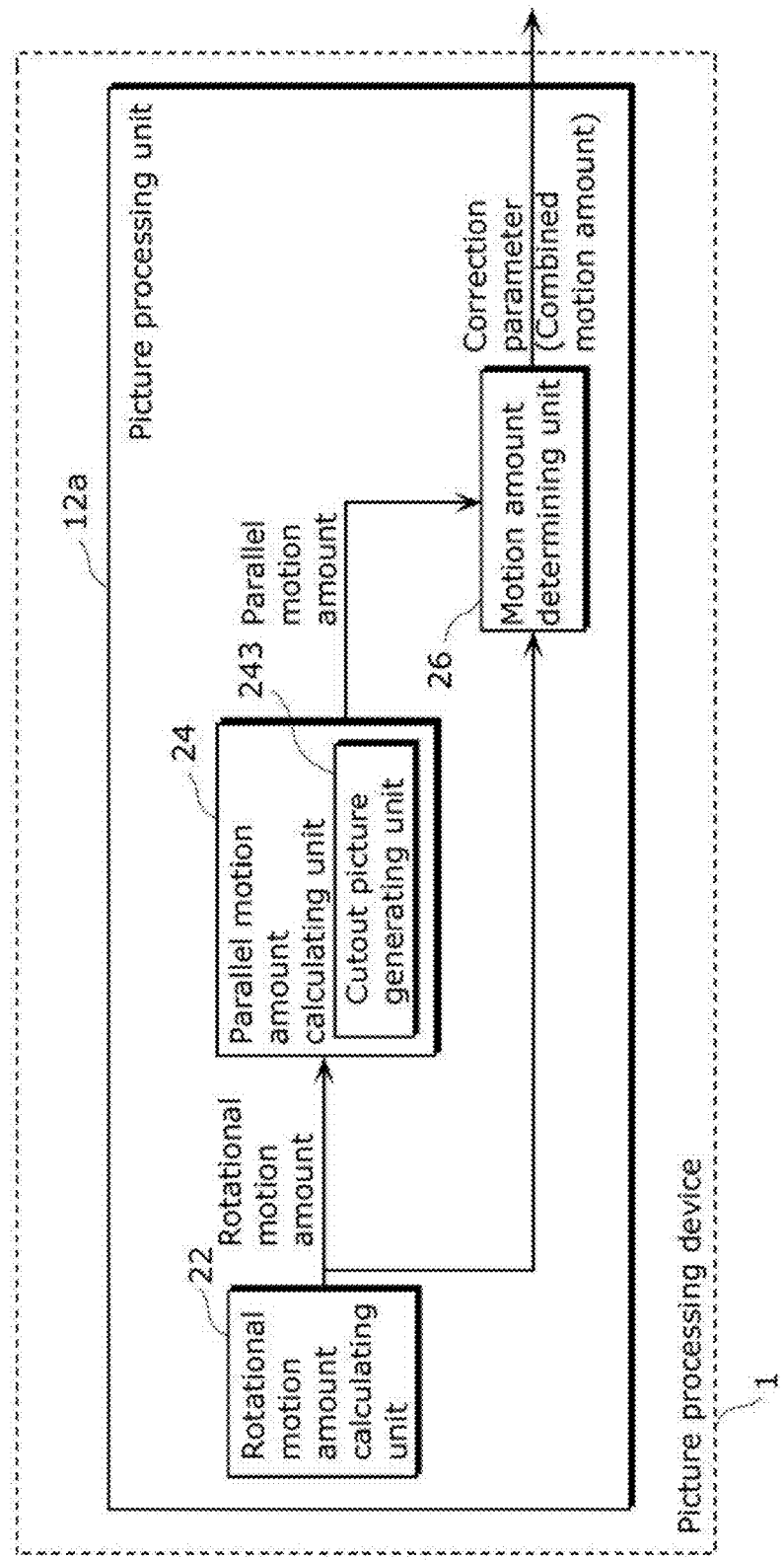
FIG. 12 shows a minimal structure of the picture processing device according to Embodiment 1 of the present invention.

It is noted that, in the above description, the picture processing device 1 includes the picture obtaining unit 11 and the picture processing unit 12, and the picture processing unit 12 includes the rotational motion amount calculating unit 22, the rotational motion amount determining unit 23, the parallel motion amount calculating unit 24, the parallel motion amount determining unit 25, the motion amount determining unit 26, and the memory 28; however, the structure of the picture processing device 1 shall not be limited to this. FIG. 12 shows that, as a minimal structure of the picture processing device 1, a picture processing unit 12a may include the rotational motion amount calculating unit 22, the parallel motion amount calculating unit 24 having the cutout picture generating unit 243, and the motion amount determining unit 26. Here, FIG. 12 shows a minimal structure of the picture processing device according to Embodiment 1 of the present invention. The elements similar to those in FIG. 12 have the same numerical references as those in FIG. 4 have, and the details thereof shall be omitted.

Since the picture processing device 1 includes at least the picture processing unit 12a, the picture processing device 1 can calculate in high accuracy a motion blur amount between pictures which are obtained by temporally-continuous capturing. The picture processing device 1 achieves effects of calculating a motion blur amount in high accuracy and correcting the blur even though pictures are captured in an ultrawide angle, such as fisheye images, and the motion amount between the pictures is so great that the distortion in the pictures cannot be ignored.

Embodiment 2

Embodiment 1 involves calculating the rotational motion amount through the picture processing performed by the rotational motion amount calculating unit 22; however, the calculation shall not be limited to this. Described here is how Embodiment 2 involves calculating the rotational motion amount by a rotational motion amount calculating unit not through the picture processing but with the use of a sensor.

Figure 13:
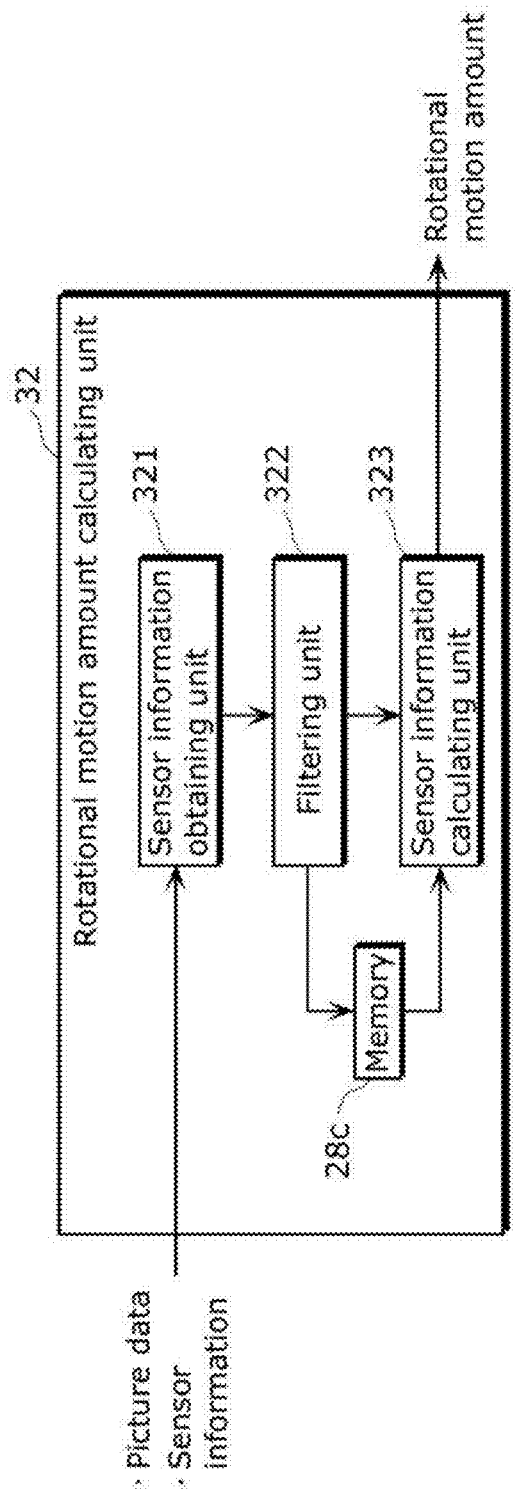
FIG. 13 depicts a block diagram exemplifying a detailed structure of a rotational motion amount calculating unit according to Embodiment 2 of the present invention.

FIG. 13 depicts a block diagram exemplifying a detailed structure of a rotational motion amount calculating unit according to Embodiment 2 of the present invention. The elements similar to those in FIG. 13 have the same numerical references as those in FIG. 5 have, and the details thereof shall be omitted.

A rotational motion amount calculating unit 32 in FIG. 13 includes a sensor information obtaining unit 321, a filtering unit 322, a sensor information calculating unit 323, and a memory 28c.

The sensor information obtaining unit 321 obtains information (sensor information) from a sensor provided to a not-shown imaging device. It is noted that the sensor is physically provided to the imaging device; instead, the sensor may logically be included in the sensor information obtaining unit 321.

The sensor provided to the imaging device synchronizes with at least an image, and measures the motion of the camera at sample intervals greater than the frame rate of the image. Since the rotational motion amount calculating unit 32 calculates a rotational motion amount, the sensor used here is preferably capable of measuring a rotational component, such as an angular velocity sensor and an angular acceleration sensor. It is noted that an acceleration sensor and a direction sensor may also be used as the sensor since these sensors can approximately calculate an angle of rotation.

The filtering unit 322 performs filtering for each measurement axis of sensor information. Here, details of the processing by the filtering unit 322 vary depending on sensor types and obtainment rates. In using the angular velocity sensor and the angular acceleration sensor, a typical processing involves removing spike noise and activating a high pass filter (HPF). In using the acceleration sensor, in contrast, a low pass filter (LPF) is typically used. The characteristics of the filters may be set based on the characteristics (frequency sensitivity and dynamic range) of a sensor which each of the filters uses, and the characteristics of a motion to be detected. When the sample rate of the sensor information is higher than the frame rate of the picture, multiple pieces of sensor information are used to estimate a motion amount obtained when the image is captured.

The memory 28c holds the result of the performance by the filtering unit 322 and at least one piece of sensor information on at least the previous filter processing and before. It is noted that the memory 28c does not have to be included in the rotational motion amount calculating unit 32. Instead, the memory 28c may be part of the memory 28.

The sensor information calculating unit 323 calculates a rotational motion amount based on an output from the filtering unit 322 and sensor information held in the memory 28c. In other words, the sensor information calculating unit 323 extracts the rotational motion amount from the sensor information. The simplest processing is to obtain, for each measurement axis of the sensor, the difference between the most recent sensor information and the sensor information that temporally only one sample (synchronizing with the picture) before. This is how the rotational motion amount is calculated.

That is how the rotational motion amount calculating unit 32 is structured.

It is noted that, in Embodiment 2, the picture processing device 1 includes the rotational motion amount calculating unit 32 in FIG. 13 instead of the rotational motion amount calculating unit 22 in FIG. 5. Similar to the case in Embodiment 1, the rotational motion amount determining unit 23 may determine whether or not the calculation of the rotational motion amount is successful by comparing the calculated rotational motion amount with the previously-calculated rotational motion amount time-wise, based on the fact that whether or not the calculated rotational motion amount is a difference within a predetermined range.

Described next is an operation of the picture processing device in Embodiment 2 as structured above.

Figure 14:
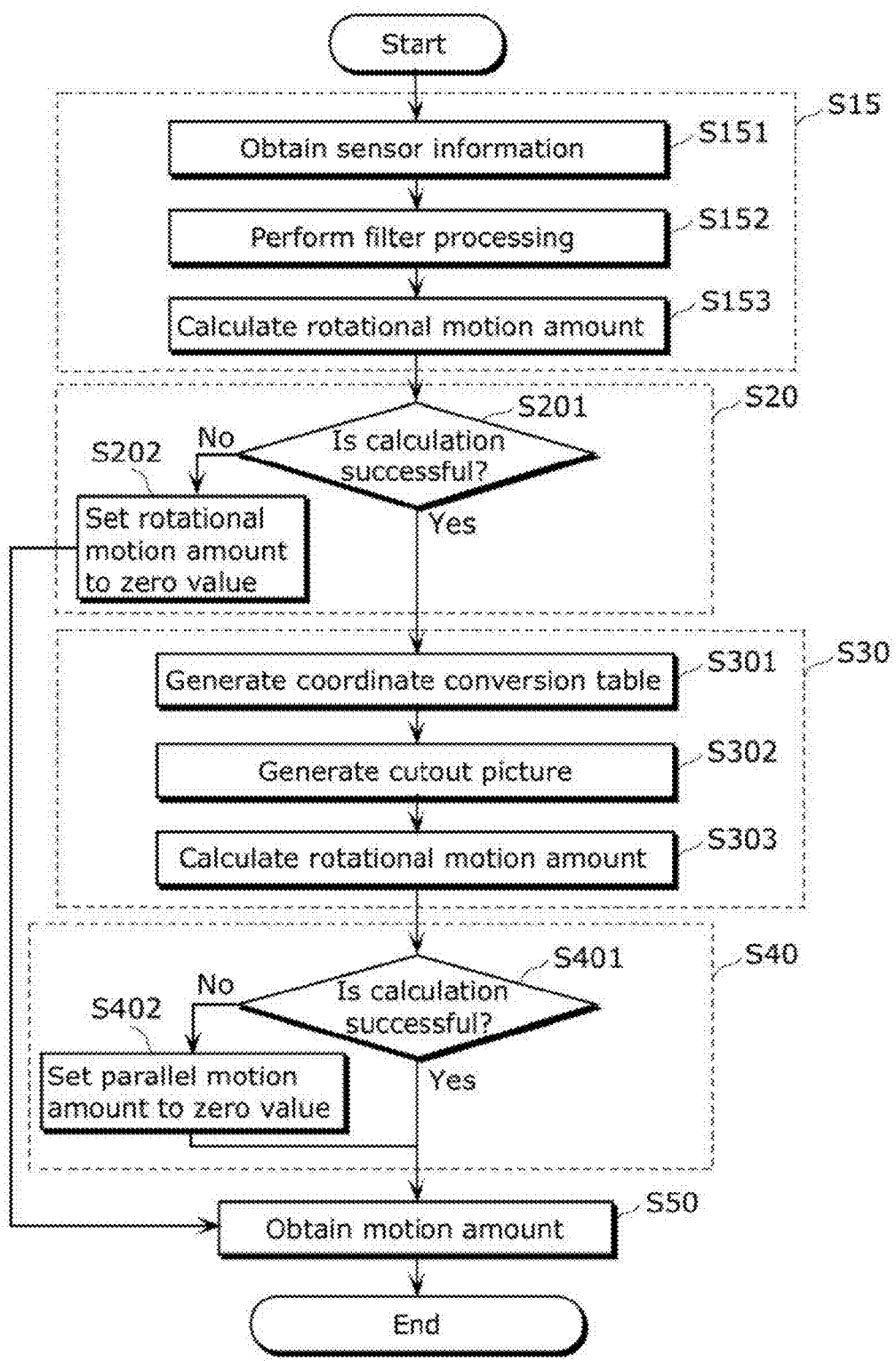
FIG. 14 depicts a flowchart showing an operation of the picture processing device according to Embodiment 2 of the present invention.

FIG. 14 depicts a flowchart showing an operation of the picture processing device according to Embodiment 2 of the present invention. The elements similar to those in FIG. 11 have the same numerical references as those in FIG. 11 have, and the details thereof shall be omitted.

The rotational motion amount calculating unit 22 obtains the picture data to be processed from the picture obtaining unit 11, and calculates a rotational motion amount found between the two pictures (for example, a first picture and a second picture) to be processed (S15). Specifically, the sensor information obtaining unit 321 obtains the picture data to be processed from the picture obtaining unit 11, and obtains, via a sensor, sensor information on the pictures to be processed (S151). Then, the filtering unit 152 performs filtering for each measurement axis of the sensor information (S152). Then, the sensor information calculating unit 323 calculates a rotational motion amount based on the output from the filtering unit 322 and the sensor information held in the memory 28c (S153).

Next, the rotational motion amount determining unit 23 determines whether or not the rotational motion amount is successfully calculated by comparing the calculated rotational motion amount with the previously-calculated rotational motion amount time-wise, based on the fact that whether or not the calculated rotational motion amount is a difference within a predetermined range (S20). The following processing is similar to that in Embodiment 1, and the details thereof shall be omitted.

As described above, the picture processing device determines a motion amount which is a correction parameter for correcting displacement between pictures obtained by temporally-continuous capturing. Then, based on the determined motion amount, the picture processing device generates a corrected picture having corrected displacement between the pictures obtained by the temporally-continuous capturing.

It is noted that, when a sensor is used to calculate a rotational motion amount, as shown in the picture processing device according to Embodiment 2, the calculation of the rotational motion amount in Embodiment 2 differs from the calculation of a rotational motion amount through picture processing in Embodiment 1. In Embodiment 2, the rotational motion amount is obtained from the result of measuring the motion of the imaging device itself, instead of an approximate rotational motion amount of the entire picture. The sensor, however, has physical restrictions such as sensitivity to impact, overlap of inertial noise and cross-axis sensitivity, and reduction in accuracy in the case where a significant gap is found between the sensor characteristics and the movement to be detected. Consequently, there is a limitation in making high-accuracy correction based only on the rotational motion amount. Hence, used here is the technique similar to that used in Embodiment 1; that is to use parallel motion amount calculating unit 24 to obtain a parallel motion amount, and to use the motion amount determining unit 26 to combine the calculated rotational motion amount with the parallel motion amount. This operation allows high-accuracy correction.

Hence, Embodiment 2 successfully implements a picture processing device which calculates in high accuracy a motion blur amount between pictures which are captured in a temporally-continuous manner, a picture processing method for the picture processing device, a program for the picture processing method, and an imaging device. For example, the picture processing device and the picture processing method successfully calculate in high accuracy a motion blur amount, while a conventional technique has had a difficulty in calculating a blur amount for an ultrawide image, such as a fisheye image. Based on the determined motion blur amount, the device and the method successfully improve quality of images in viewing and listening. In other words, the picture processing device and the picture processing method achieve effects of calculating a motion blur amount in high accuracy and correcting the blur even though pictures are captured in an ultrawide angle, such as fisheye images, and the motion amount between the pictures is so great that the distortion in the pictures cannot be ignored.

Embodiment 3

Embodiment 3 exemplifies an imaging device including the picture processing device according to either Embodiment 1 or Embodiment 2.

Figure 15:
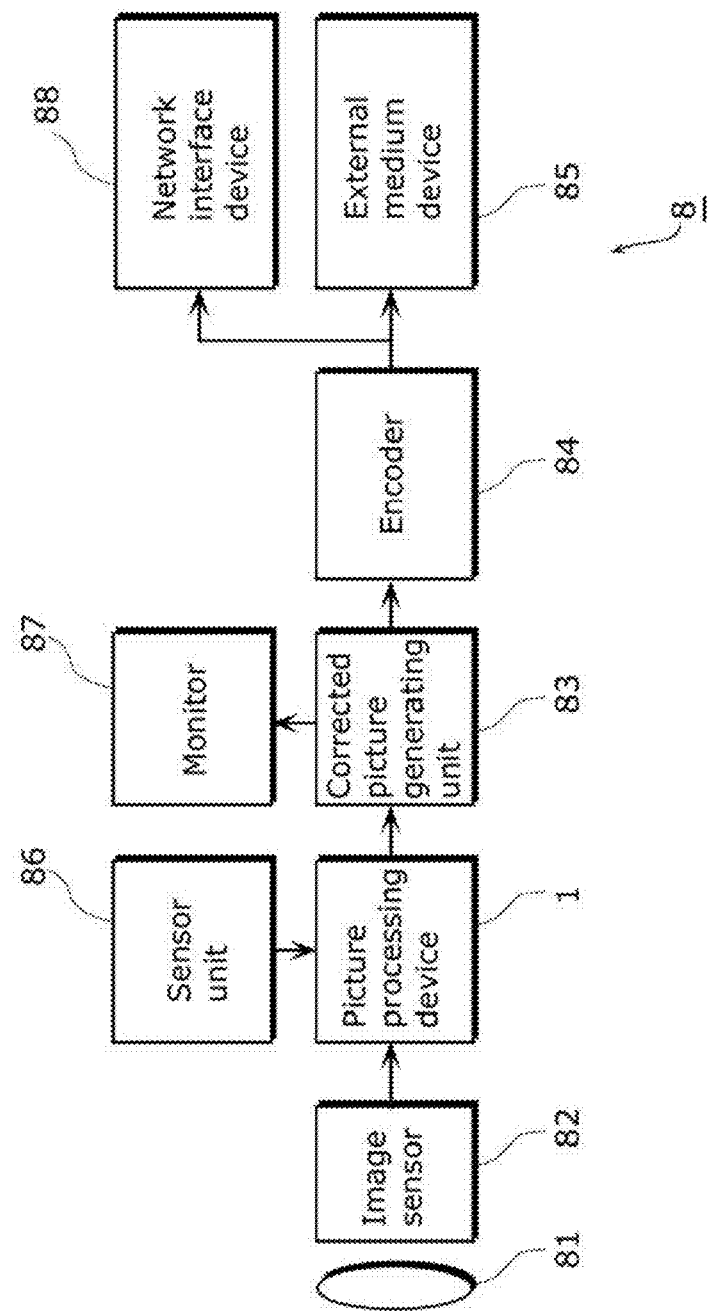
FIG. 15 depicts a block diagram showing a structure of an imaging device according to Embodiment 3 of the present invention including the picture processing device according to an implementation of the present invention.

FIG. 15 depicts a block diagram showing a structure of an imaging device according to Embodiment 3 of the present invention including the picture processing device according to an implementation of the present invention. FIG. 16 depicts a block diagram showing a structure of a reproducing device according to Embodiment 3 of the present invention.

An imaging device 8 shown in FIG. 15 includes: the picture processing device 1 according to an implementation of the present invention, a lens unit 81 for gathering light, an image sensor 82, a corrected picture generating unit 83, an encoder 84, an external medium device 85, a sensor unit 86, a monitor 87, and a network interface device 88.

The lens unit 81 collects picture data forming an image. The image sensor 82 is used for collecting picture data forming an image. The image sensor 82 generates a picture from light collected by the lens unit 81, and provides the generated picture. The image sensor 82 may be formed of, for example, a charge-coupled device (CCD) and a complementary metal-oxide semiconductor (CMOS).

The sensor 86 includes' a sensor, and provides sensor information to the picture processing device 1. The sensor unit 86 is provided when the picture processing device 1 includes the rotational motion amount calculating unit 32 and utilizes the sensor information. The sensor unit 86 does not have to be provided when the picture processing device 1 includes the rotational, motion amount calculating unit 22 and calculates a rotational motion amount through picture processing.

The picture processing device 1 provides, to the corrected picture generating unit 83, the obtained picture data together with the correction parameter (motion amount) determined by the picture Processing unit 12 according to the technique described in Embodiment 1 or Embodiment 2.

The corrected picture generating unit 83 generates a corrected picture (cutout picture for display and record) based on the correction parameter (motion amount). Here, the corrected picture generating unit 83 may be provided out of the picture processing device 1; instead, the corrected picture generating unit 83 may be included in the picture processing device 1 as described above.

The monitor 87 checks, on a real-time basis, the corrected image (corrected picture) generated by the corrected picture generating unit 83. It is noted that the monitor 87 does not have to be installed when there is no need of the real-time checking on the corrected image (corrected picture) generated by the corrected picture generating unit 83. Instead of the monitor 87, the imaging device 8 may have a not-shown terminal for image output and display the corrected image on an external monitor via the terminal.

The encoder 84 generates coded moving picture data. Specifically, the encoder 84 compresses (encodes) the corrected image generated by the corrected picture generating unit 83 using a video compression technique, such as H.264, and provides the compressed corrected image to the external medium device 85 and the network interface device 88. Here, in the case where there is audio information, the encoder 84 synchronizes the audio information with the image and encodes both of the information. It is noted that a selecting unit may be placed before the encoder 84 to select, as the picture to be encoded by the encoder 84, at least one of a picture generated by the image sensor 82 and a picture generated by the corrected picture generating unit 83.

The external medium device 85 records the corrected image (corrected cutout image) compressed by the encoder 84 on media including a secure digital (SD) card, hard disc, and a digital versatile disc (DVD).

Moreover, the network interface device 88 may distribute via a network the corrected image encoded by the encoder 84.

It is noted that the encoder 84 encodes not only a corrected image (corrected cutout image). In addition, the encoder 84 may synchronize the correction parameter (motion amount) determined by the picture processing device 1 with the image data obtained by the image sensor 82, pack the correction parameter and the image data in a form of a data source, and encode the data source. Here, the encoder 84 transfers the compressed image data to a reproducing device in FIG. 16 via a medium or a network.

A reproducing device 9 in FIG. 16 includes: at least one of the external medium device 85 for reading compressed image data and the network interface device 88 for receiving compressed image data; a buffer 91, a decoder 92, and the corrected picture generating unit 83. The reproducing device 9 is capable of simultaneously decoding the compressed image data and extracting a corrected parameter, and of generating, to provide, motion-blur-corrected image data.

It is noted that the reproducing device 9 may be included in the imaging device 8. Moreover, the reproducing device 9 may be placed before the picture processing device 1 or may be included in the picture obtaining unit 11.

Furthermore, the reproducing device 9 may be included in the picture obtaining unit 11 in the picture processing device 1, and the imaging device 8 may be placed before the picture processing device 1. Here, the picture obtaining unit 11 obtains coded moving picture data (coded picture), and provides decoded pictures to a picture processing unit.

It is noted that the network interface device 88 shall not be limited to the Internet; instead, the network interface device 88 may be a universal serial bus (USB) and the IEEE1394.

Hence, the present invention successfully implements a picture processing device which calculates a motion blur amount in high accuracy.

Although the picture processing device, the imaging device including the picture processing device, the picture processing method, and the picture processing program have been described based on some exemplary embodiments of this invention in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A picture processing device according to an implementation of the present invention includes two motion amount calculating units for calculating a rotational motion amount and a parallel motion amount, and is useful as a motion blur correction device. In addition, the picture processing device is applicable to ultrawide-angle capturing, such as capturing fisheye images. Hence, the picture processing device is useful for a camera wearable on the user with hands-free capability and a surveillance camera installed on a bridge and a street.

REFERENCE SIGNS LIST

1. Picture processing device
8. Imaging device
9. Reproducing device
11. Picture obtaining unit
12 and 12a. Picture processing unit
22 and 32. Rotational motion amount calculating unit
23. Rotational motion amount determining unit
24. Parallel motion amount calculating unit
25. Parallel motion amount determining unit
26. Motion amount determining unit
28, 28a, 28b, and 28c Memory
61. Spherical surface
62. Light
63. Picture data plane
64. Lens
71 and 72. Cutout picture
81. Lens unit
82. Image sensor
83. Corrected picture generating unit
84. Encoder
85. External medium device
86. Sensor unit
87. Monitor
88. Network interface device
91. Buffer
92. Decoder
221. Feature point extracting unit
222. Distortion removing unit 223. Feature point matching unit
224. Error minimizing unit
241. First corrected picture generating unit
242. Coordinate transformation table generating unit 242
243. Cutout picture generating unit
244. Pattern matching unit
321. Sensor information obtaining unit
322. Filtering unit
323. Sensor information calculating unit

The invention claimed is:

1. A picture processing device which corrects displacement between pictures obtained by temporally-continuous capturing, said picture processing device comprising:
   a rotational motion amount calculating unit configured to calculate a rotational motion amount indicating a rotational displacement amount of a second picture with respect to a first picture, the rotational displacement amount being obtained based on a combination of axis rotational directions of mutually perpendicular three axes, and the second picture being captured temporally after the first picture;
   a cutout picture generating unit configured to generate a first cutout picture from the first picture and a second cutout picture from the second picture;
   a parallel motion amount calculating unit configured to calculate a parallel motion amount indicating a displacement amount of the second cutout picture with respect to the first cutout picture;
   a motion amount determining unit configured to determine, based on the calculated rotational motion amount and the calculated parallel motion amount, a motion amount indicating a displacement amount of the second picture with respect to the first picture; and
   a correcting unit configured to correct the displacement amount of the second picture with respect to the first picture, based on the motion amount,
   wherein said cutout picture generating unit is configured to (i) cut out from the first picture a predetermined first area, and generate the first cutout picture by performing, based on characteristics of an optical system used for capturing, distortion correction on the predetermined first area which is cut out, and (ii) cut out from a first corrected picture a second area corresponding to the predetermined first area, and generate the second cutout picture by performing the distortion correction on the corresponding second area which is cut out, the first corrected picture being generated from the second picture whose rotational displacement amount, in the combination of the three-axis rotational directions, is corrected based on the calculated rotational motion amount.

2. The picture processing device according to claim 1, wherein said parallel motion amount calculating unit is configured to calculate, based on mutually-perpendicular three axes with respect to the first cutout picture, the parallel displacement amount of the second cutout picture with respect to the first cutout picture so as to obtain the parallel motion amount, the parallel displacement amount extending in at least one of directions in the mutually-perpendicular three axes.

3. The picture processing device according to claim 2, wherein said parallel motion amount calculating unit is configured to calculate the parallel motion amount of the second cutout picture with respect to the first cutout picture as a value indicating a magnification percentage or a reduction percentage of the second cutout picture with respect to the first cutout picture, using one of the three axes as an axis perpendicular to the first cutout picture, the parallel motion amount extending in a direction of the axis perpendicular to the first cutout picture.

4. The picture processing device according to claim 2, wherein said parallel motion amount calculating unit is configured to calculate the parallel motion amount of the second cutout picture by one of pattern matching scheme, object matching, and feature point matching between the first cutout picture and the second cutout picture.

5. The picture processing device according to claim 1, wherein said parallel motion amount calculating unit includes
   a first corrected picture generating unit configured to generate the first corrected picture from the second picture whose rotational displacement amount in the combination of the three-axis rotational directions is corrected based on the calculated rotational motion amount, and
   said first corrected picture generating unit further includes
   a coordinate transformation table generating unit configured to generate, based on the calculated rotational motion amount, a coordinate transformation table indicating a correspondence between each of pixels in the first corrected picture and an associated one of the pixels in the second picture, and is configured to (i) cause said coordinate transformation table generating unit to generate the coordinate transformation table, and (ii) generate the first corrected picture using the coordinate transformation table generated by said coordinate transformation table generating unit.

6. The picture processing device according to claim 1, wherein said cutout picture generating unit is
   configured to generate perspective projection pictures for the predetermined first area and for the corresponding second area for performing the distortion correction on the predetermined first area and the corresponding second area so as to generate the first cutout picture and the second cutout picture.

7. The picture processing device according to claim 1, further comprising
   a rotational motion amount determining unit configured to determine, before the calculation by said parallel motion amount calculating unit, whether or not the rotational motion amount is successfully calculated,
   wherein in the case where a result of the determination shows that the rotational motion amount is successfully calculated, said rotational motion amount determining unit is configured to provide the rotational motion amount to said parallel motion amount calculating unit, and
   in the case where the result of the determination shows that calculation of the rotational motion amount fails, said rotational motion amount determining unit is configured to (i) provide, to said parallel motion amount calculating unit and said motion amount determining unit, the failed rotational motion amount as a zero value indicating that no displacement is found in the combination of the three-axis rotational directions, and (ii) cause said motion amount determining unit to determine the zero value as the motion amount indicating the displacement amount of the second picture with respect to the first picture.

8. The picture processing device according to claim 1, further comprising
   a parallel motion amount determining unit configured to determine, after the calculation by said parallel motion amount calculating unit, whether or not the parallel motion amount is successfully calculated, wherein in the case where a result of the determination shows that the parallel motion amount is successfully calculated, said parallel motion amount determining unit is configured to provide the parallel motion amount to said motion amount determining unit, and in the case where the result of the determination shows that calculation of the parallel motion amount fails, said parallel motion amount determining unit is configured to provide, to said motion amount determining unit, the parallel motion amount as a zero value indicating that no displacement is found in the parallel direction.

9. The picture processing device according to claim 1, wherein said rotational motion amount calculating unit is configured to calculate the rotational motion amount of the second picture with respect to the first picture through a calculation of (i) a rotation angle of a light axis of the optical system or (ii) a rotation angle of at least one of two axes mutually perpendicular to the light axis of the optical system.

10. The picture processing device according to claim 9, wherein said rotational motion amount calculating unit includes at least one sensor which measures the rotation angle.

11. The picture processing device according to claim 10, wherein said sensor is at least one of an angular acceleration sensor, an angular velocity sensor, an acceleration sensor, and a direction sensor.

12. The picture processing device according to claim 1, wherein said rotational motion amount calculating unit includes:
a feature point extracting unit configured to extract a feature point from each of the first picture and the second picture;
a distortion removing unit configured to remove distortion due to optical strain caused by the optical system and found between the feature point of the first picture and the feature point of the second picture;
a feature point matching unit configured to match the feature point of the first picture with the feature point of the second picture, the first picture and the second picture having the optical distortion removed by said distortion removing unit; and
an error minimizing unit configured to calculate the rotational motion amount based on a pair of (i) the feature point of the first picture and (ii) the feature point, of the second picture, corresponding to the feature point of the first picture, so that said error minimizing unit minimizes an error made when the displacement found in the second picture and extending in the combination of the three-axis rotational directions is to be corrected, the feature point of the first picture and the feature point of the second picture being successfully matched with each other by said feature point matching unit.

13. The picture processing device according to claim 1, wherein said motion amount determining unit is configured to determine, as the motion amount, a combined motion amount having the calculated rotational motion amount and the calculated parallel motion amount combined with each other.

14. The picture processing device according to claim 13, further comprising:
a corrected picture generating unit configured to generate, based on the motion amount determined by said motion amount determining unit, a corrected picture from the second picture whose displacement is corrected; and
a memory which stores the picture generated by said corrected picture generating unit.

15. The picture processing device according to claim 14, further comprising:
a picture data obtaining unit configured to obtain a coded picture; and
a decoding unit configured to decode the coded picture obtained by said picture data obtaining unit, extract continuous picture data, and sequentially provide the continuous picture data to said first motion amount calculating unit,
wherein when the coded picture includes picture data, audio data, and sensor information, said decoding unit is configured to separate the coded picture into the picture data, the audio data, and the sensor information one another, and hold a synchronous relationship between the extracted continuous picture data and each of the picture data, the audio data, and the sensor information.

16. An imaging device comprising:
said picture processing device according to claim 1;
a lens unit configured to gather light;
an image sensor which records the light gathered by said lens unit and generates a picture from the recorded light, and provides the generated picture to said first motion amount calculating unit in said picture processing device;
a corrected picture generating unit configured to generate a corrected picture from the second picture whose displacement is corrected, the corrected picture being generated based on the motion amount determined by said motion amount determining unit included in said picture processing device;
an encoder which encodes an incoming picture to generate a coded picture; and
a selecting unit configured to select at least one of the picture generated by said image sensor and the picture generated by said corrected picture generating unit, and provide the one selected picture to said encoder.

17. The imaging device according to claim 16, further comprising
a sensor which measures a motion of said imaging device,
wherein said sensor measures a motion of said imaging device by synchronizing the motion with a picture captured by said imaging device, and provides, to said first motion amount calculating unit, the measured motion and the picture corresponding to the measured motion.

18. A picture processing method for correcting displacement between pictures obtained by temporally-continuous capturing, said picture processing method comprising:
calculating a rotational motion amount indicating a rotational displacement amount of a second picture with respect to a first picture, the rotational displacement amount being obtained based on a combination of axis rotational directions of mutually perpendicular three axes, and the second picture being captured temporally after the first picture;
generating a first cutout picture from the first picture and a second cutout picture from the second picture;
calculating a parallel motion amount indicating a displacement amount of the second cutout picture with respect to the first cutout picture;
determining, based on the calculated rotational motion amount and the calculated parallel motion amount, a motion amount indicating a displacement amount of the second picture with respect to the first picture; and
correcting the displacement amount of the second picture with respect to the first picture, based on the determined motion amount, wherein said generating involves (i) cutting out from the first picture a predetermined first area, and generating the first cutout picture by performing, based on characteristics of an optical system used for capturing, distortion correction on the predetermined first area which is cut out, and (ii) cutting out from a first corrected picture a second area corresponding to the predetermined first area, and generating the second cutout picture by performing the distortion correction on the corresponding second area which is cut out, the first corrected picture being generated from the second picture whose rotational displacement amount, in the combination of the three-axis rotational directions, is corrected based on the calculated rotational motion amount.

19. A non-transitory computer-readable recording medium for use in a computer, said recording medium having a computer program recorded thereon, the computer program causing the computer to correct displacement between pictures obtained by temporally-continued capturing, and the program causing the computer to execute:

calculating a rotational motion amount indicating a rotational displacement amount of a second picture with respect to a first picture, the rotational displacement amount being obtained based on a combination of axis rotational directions of mutually perpendicular three axes, and the second picture being captured temporally after the first picture;

generating a first cutout picture from the first picture and a second cutout picture from the second picture;

calculating a parallel motion amount indicating a displacement amount of the second cutout picture with respect to the first cutout picture;

determining, based on the calculated rotational motion amount and the calculated parallel motion amount, a motion amount indicating a displacement amount of the second picture with respect to the first picture; and correcting the displacement amount of the second picture with respect to the first picture, based on the determined motion amount, wherein said generating involves (i) cutting out from the first picture a predetermined first area, and generating the first cutout picture by performing, based on characteristics of an optical system used for capturing, distortion correction on the predetermined first area which is cut out, and (ii) cutting out from a first corrected picture a second area corresponding to the predetermined first area, and generating the second cutout picture by performing the distortion correction on the corresponding second area which is cut out, the first corrected picture being generated from the second picture whose rotational displacement amount, in the combination of the three-axis rotational directions, is corrected based on the calculated rotational motion amount.

20. An integrated circuit for correcting displacement between pictures obtained by temporally-continued capturing, said integrated circuit comprising:

a rotational motion amount calculating unit configured to calculate a rotational motion amount indicating a rotational displacement amount of a second picture with respect to a first picture, the rotational displacement amount being obtained based on a combination of axis rotational directions of mutually perpendicular three axes, and the second picture being captured temporally after the first picture;

a cutout picture generating unit configured to generate a first cutout picture from the first picture and a second cutout picture from the second picture;

a parallel motion amount calculating unit configured to calculate a parallel motion amount indicating a displacement amount of the second cutout picture with respect to the first cutout picture;

a motion amount determining unit configured to determine, based on the calculated rotational motion amount and the calculated parallel motion amount, a motion amount indicating a displacement amount of the second picture with respect to the first picture; and a correcting unit configured to correct the displacement amount of the second picture with respect to the first picture, based on the motion amount, wherein said cutout picture generating unit is configured to (i) cut out from the first picture a predetermined first area, and generate the first cutout picture by performing, based on characteristics of an optical system used for capturing, distortion correction on the predetermined first area which is cut out, and (ii) cut out from a first corrected picture a second area corresponding to the predetermined first area, and generate the second cutout picture by performing the distortion correction on the corresponding second area which is cut out, the first corrected picture being generated from the second picture whose rotational displacement amount, in the combination of the three-axis rotational directions, is corrected based on the calculated rotational motion amount.

* * * * *